(12) United States Patent
Truong et al.

(10) Patent No.: US 7,172,386 B2
(45) Date of Patent: Feb. 6, 2007

(54) WIND AND SOLAR POWER PLANT WITH VARIABLE HIGH SPEED ROTOR TRAINS

(76) Inventors: Minh-Hoang Dinh Truong, 1303 Stanley Blvd., Birmingham, MI (US) 48009; Yevgeniya Sosonkina, 1303 Stanley Blvd., Birmingham, MI (US) 48009

( * ) Notice: Subject to any disclaimer, the term of this patent is extended or adjusted under 35 U.S.C. 154(b) by 198 days.

(21) Appl. No.: 10/911,882

(22) Filed: Aug. 5, 2004

(65) Prior Publication Data
US 2006/0026954 A1    Feb. 9, 2006

(51) Int. Cl.
*F03D 3/02* (2006.01)

(52) U.S. Cl. .......................... 415/4.1; 290/55
(58) Field of Classification Search ............... 415/4.1
See application file for complete search history.

(56) References Cited

U.S. PATENT DOCUMENTS

| | | | |
|---|---|---|---|
| 4,156,580 A | 5/1979 | Pohl | 415/2 |
| 4,258,271 A | 3/1981 | Chappel | 290/55 |
| 4,320,304 A | 3/1982 | Karlsson | 290/55 |
| 4,321,005 A | 3/1982 | Black | 415/4 |
| 4,606,697 A | 8/1986 | Appel | 415/2 |
| 4,764,683 A | 8/1988 | Coombes | 290/55 |
| 5,429,480 A | 7/1995 | Van-Der-Veken | 416/120 |
| 5,639,208 A | 6/1997 | Theis | 415/60 |
| 5,836,738 A | 11/1998 | Finney | 415/60 |
| 6,249,059 B1 | 6/2001 | Hosoda | 290/55 |
| 6,538,340 B2 | 3/2003 | Elder | 290/55 |
| 6,590,363 B2 * | 7/2003 | Teramoto | 290/55 |
| 6,710,468 B1 | 3/2004 | O'Shanahan | 290/55 |
| 6,749,393 B2 | 6/2004 | Sosonkina | |
| 2003/0122380 A1 | 7/2003 | Harbisson | 290/55 |
| 2003/0178856 A1 | 9/2003 | Ohya et al. | 290/55 |

FOREIGN PATENT DOCUMENTS

| | | |
|---|---|---|
| FR | 2 450 362 | 2/1979 |
| FR | 2474604 | 1/1980 |

\* cited by examiner

*Primary Examiner*—Edward K. Look
*Assistant Examiner*—Richard Edgar

(57) ABSTRACT

A wind and solar power plant, producing electrical energy at any scale, site, and level above the ground, and with almost no wind, comprises rotor trains, mounted on decks of a garage-like building, each rotor train having a plurality of rotors positioned between a shroud and a wind tunnel. The wind is accelerated in a low middle part of the wind tunnel while flows from a high entrance towards a higher and wider exit. The blades of the rotors protrude into the middle part of the wind tunnel causing fast rotation of the rotors around horizontal axes. A super-diffuser, a booster and a wind tunnel are increasing the power of the wind and rotors in hundreds of times. Each rotor train comprises up to six rotors connected with twelve electrical generators. Electrical energy can be also produced by solar panels, mounted on the balconies and on the roof of the building.

20 Claims, 18 Drawing Sheets

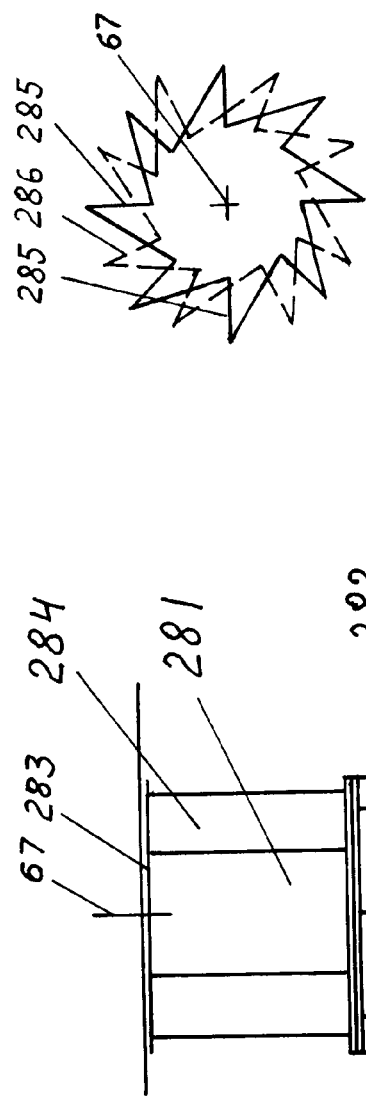

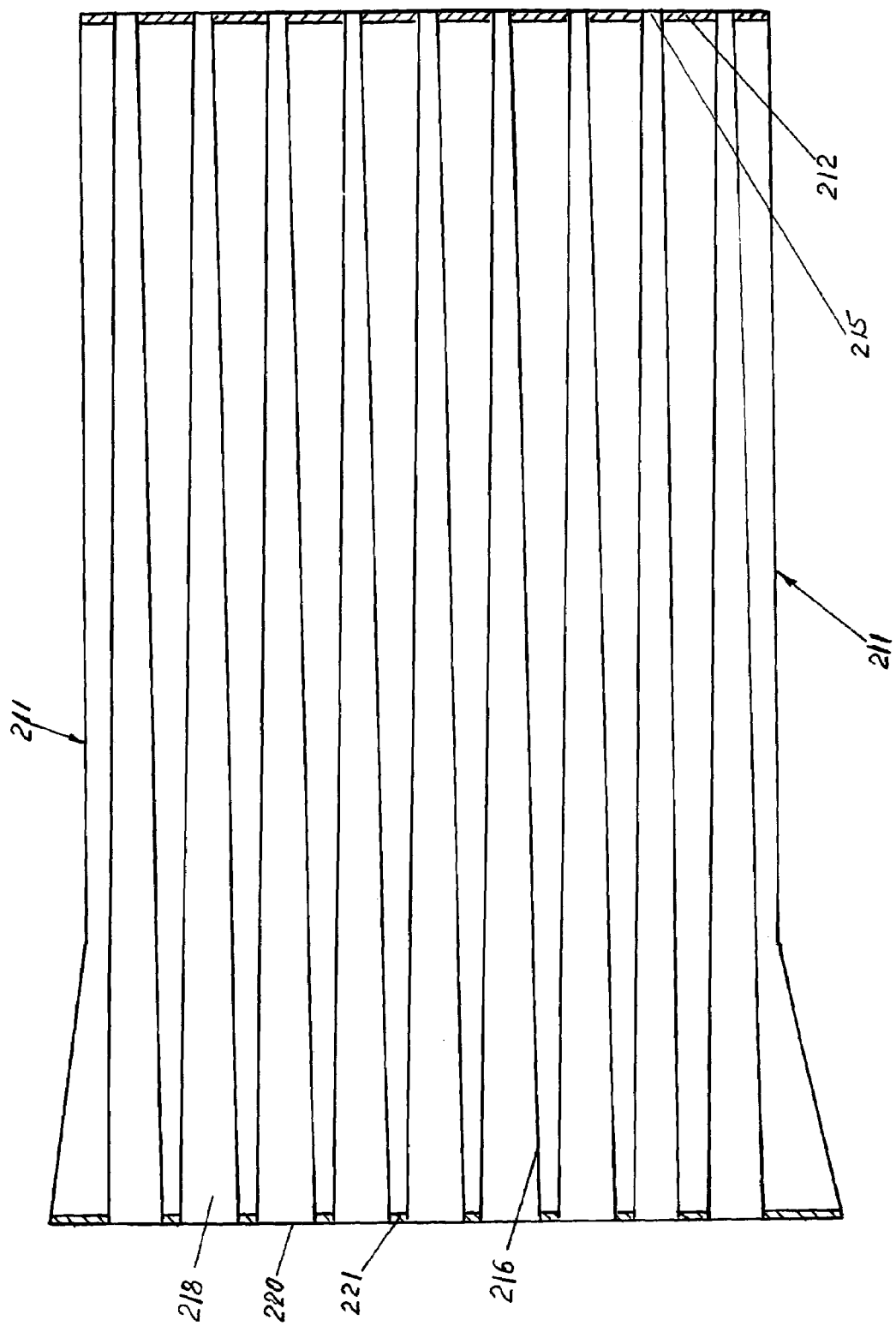

WIND AND SOLAR POWER PLANT WITH VARIABLE HIGH SPEED ROTOR TRAINS

CROSS-REFERENCE TO RELATED APPLICATIONS

Related and not relied upon U.S. Pat. No. 6,749,393, Jun. 15, 2004 awarded to Y. Sosonkina.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The invention relates to the wind and solar power plants, specifically to such plants which utilize a plurality of rotors, having horizontal axes of rotation, disposed in one building, having means for positioning these rotors towards the direction of the wind and having means for accelerating and guiding the wind towards these rotors. The invention also relates to the power plants utilizing the energy of the sun by converting this energy collected by solar panels into electrical current.

The invented power plant can produce electrical energy at any scale and at a lower cost compared to power plants, that utilize other sources of energy, such as gas, coal, water, or nuclear energy. The invention can work at any site, at any level above or on the ground, by utilizing and accelerating the lowest available wind.

Proposed invention does not pollute the area and does not need as much repairs, maintenance, or expensive protection against terrorist acts or natural disasters, such as earth quake, as compared to nuclear or hydro power plants.

The currently known wind power plants can not win the competition because they do not provide reliable devices, utilizing the advantages and availability of the wind and sun as a source of energy.

Most of the known power systems, utilizing the wind and solar energy, depending on availability of a strong wind, are too small to produce electrical energy on a large scale, use only one generator for transforming the energy of the wind into electrical current, need constant maintenance, and making the cost of the produced energy too high.

For example, in U.S. Pat. No. 4,321,005, Black shows a modular windmill installation, wherein a plurality of individual wind wheels are stacked vertically in a tower-like structure, interconnected with each other and with only one electrical generator, positioned at the base. The design of the vertical shaft and the shields is too complicated and not reliable; the wind wheels are equipped with cups, instead of flat blades and thus can not provide adequate torque because the cups will be constantly filled with the air. This large power plant can produce only a small amount of energy and definitely at a very high cost.

U.S. Pat. No. 4,156,580, inventor Pohl of Canada, shows a system having a number of vertically stacked rotors in combination with a specially adapted tower structure. The tower structure shields the most of the wind energy. The rotors stacked one above another and connected with one vertical shaft, transferring all the collected energy to only one generator; so, the output of energy can not be cost efficient. The weight and related stress do not allow making this shaft too high. Imagine how big the shaft's diameter would be for a ten story high power plant! The rotors initially imply synchronous rotational speed (see FIG. 4), which can cause increasing vibration and can cause breakage of the system.

In U.S. Pat. No. 4,764,683, Coombes describes an invention having two vertical helical rotors, connected with a pair of electrical generators, and a housing, including forward and rear nacelles. Curved blades of the rotors (see FIG. 2) similar to what is shown in FIG. 22 of our invention as known in the prior art, are prone to collect a lot of air between the blades and do not discharge the air after a cycle of rotation, creating friction with the ambient air. The space between the blades is too big, especially for a rotor with two blades, and it takes time for the wind to fill up the space with air, so the impact on one blade will be extended in time, and cause a slow rotation of the rotor. The rotors do not have opposing guiding plates to direct the wind to the blades, as we have in our invention; so, the air of the wind will freely slip outside of the rotor blades, especially for the upper rotor in FIG. 2, having two blades. The sharp, curved and helically pitched blades are too difficult to make and they are not be durable.

In U.S. Pat. No. 4,606,697, Appel shows a pair of vertical rotors, having blades of one rotor projecting between the blades of another rotor. This invention initially implies synchronous rotation of the rotors, which can cause increased vibration and breakage of the system. The blades can stuck to each other as it is shown by phantom lines in FIG. 5, because the zone of low pressure between the adjacent blades of two rotors creates big forces, pressing the blades together. The trailing edges of the blades are difficult to make, they are thin and can be easily broken.

Patent Application Publication U.S. 2003/0122380A1, Harbison, shows a turbine with two vertical rotors, and the frame splitting the wind into two streams, rotating the rotors. The blades of the rotors curved, as it is shown in FIG. 2, similar to FIG. 22 of our invention as known in Prior Art, and will be discussed later. As shown in FIG. 2, the wind can blow from both sides of the axes of rotation of the rotors, diminishing the resulting rotating torque. The pistons 52 can not control the rotational speed of the rotors, because if the back door 45 and 46 will be closed, it will cause to open the side doors, and if we will open the back doors, it will cause to close the side doors. And any change of speed of the wind can cause slumming of the side doors, creating constant noise and turbulence of the wind flow.

U.S. Pat. No. 5,639,208, Theis, employs rotors that are rotated primarily by the frictional forces of a pressured medium flowing through a gap between the rotors. The rotors have substantially smooth surface, and, in one embodiment, have blades shaped as a triangle, but of a very small size, and facing the wind with the smooth, streamlined surface. This solution may be good for a compressor, for a high pressured medium and for a turbine, having a speed exceeding speed of sound. We did not check these conditions but we built a model with triangle shaped blades and tested it at different speeds of wind, blowing by a fan. And, of course, it worked very well, but in opposite to suggested by Theis direction, with the blades, facing the wind in a conventional way, perpendicular to the wind flow, having the front side positioned on the radius from the axis of rotation. The rotors were rotating in this case even with the lowest wind. And best of all the rotors were rotating with horizontal positioning of the axis of rotation, which of course is easy to explain. In this case it is much easier to reach less friction between the rotors and the supportive elements, the rotors are better balanced, and the bearings are loaded symmetrically. As we can see in FIGS. 3, 11, 12, 13, the spaces between the pairs of rotors are not covered as in our invention. It allows the wind to exhaust in these spaces, as it is shown in FIG. B by numerals 44, 69. The wind will lose its speed after the first pair of rotors, and will not have enough power to rotate the second and the third pair of rotors.

U.S. Pat. No. 5,429,480, Van DerVeken of Switzerland, suggested an improved wind engine, comprising a frame, having different stages, separated by decks, and propeller type devices, fixed rotatable inside the frame between supportive pillars. Such big propellers usually are installed separately, on an individual tower, with additional braces to enforce the heavy engine, rotating around the vertical axis. A conventional propeller, used for production of electrical energy, can have more than 150 feet in diameter. So, the frame for six propellers should be really big, high, and costly. The plant should have means to avoid synchronous rotation of the propellers. The work of one propeller will influence the work of the other propellers. And in general, the productivity of known propeller type rotors can not be compared with other engines, using other sources of energy.

U.S. Pat. No. 6,249,059B1, Hosoda of Japan shows a wind power device comprising a wind guide and a twisted member in the wind guide. The wind, coming into the wind guide, is guided around the twisted member and rotates a propeller. A long, twisted way for the wind flow will create large frictional forces between the wind guide and the narrowing surfaces of the twisted member and limit the power of the wind. This invention has a wide open inlet for the wind and a narrow throat of venturi, but do not provide a gradually increasing outlet for the wind. Sudden exhaust of the out-going air from the back side of the device will create turbulence, blocking the exit.

U.S. Pat. No. 4,258,271, Chappel et al, discloses a method and an apparatus for increasing the power output of an impeller, which is mounted in a stream of free flowing fluid, such as water or air. The fluid leaves the impeller at an angle not less than 35 degrees but less than 75 degrees. FIG. 4 of this patent shows approximately similar picture of our invention, although FIG. 5 of the same embodiment illustrates, that the inlet and outlet are shifted in different planes. The type of blades of this patent already was discussed in previous remarks.

U.S. Patent Application Publication No. 2003/0178856A1, Ohya et al, Japan, shows a wind power generator with a propeller rotating in a wind tunnel, accelerating a wind flow. The wind tunnel is having a cylindrical shape and expanding from an inlet to an outlet. The publication provides a number of diagrams showing, that the most efficient angle of inclination of the wind tunnel is in a range from 5 degrees to 25 degrees. These angles are completely different from what is claimed in previous patent by Chappel, and we agree that the data, provided by Japanese inventors in their diagrams, should be more accurate. But it is also clear even without any experimental work, that a smooth inclination provides a smooth air flow, and a sharp inclination, on the opposite, provided a turbulent one. So, in our invention, we tried to keep the angles of inclination of the guiding plates at the smallest possible level. At the same time, too small angles of inclination of the guiding plates create bigger size of the shroud, causing increase in all of the dimensions of the plant and an increase in the cost of the plant.

U.S. Pat. No. 6,710,468 B1 of Mar. 23, 2004, O'Shanahan describes an Elian tower, which is similar to venturi with a rotor, placed in the narrow elongated throat of venturi. Like already mentioned inventions, using a venturi for accelerating the wind flow, this invention also uses a propeller type rotor, rotating perpendicular to the direction of the wind, which creates forces, pushing the rotor in direction of the wind, creating large frictional forces in the bearings along the axis of rotation and losing the energy of the wind. And up to 40 percent of the energy will be lost accordingly to the Betz limits to stimulator 35, situated at the mouth 23 of the conduit 22. O'Shanahan claims that the accelerated wind flow will have a direction perpendicular to the sweeping planes of the rotor (30, 52) (pages 5, 30), but he does not show actually how he can do it. The blades of the propeller should be turned at an angle toward the direction of the wind in order to move across the direction of the wind. On page 3 (65), O'Shanahan writes that a conduit 22 with an intake mouth (23) of 8 meters diameter and a rotor with a sweeping area of 6 meter diameter will have 350 kW of power, but the actual ratio 8 to 6, equal to 4:3, which is shown in FIG. 4 does not give such increase in the speed of the wind and not adequate to receive such power. The conduit 22 has a first area 43, 60 of inlet with a constant cross section and an area of outlet 47, 64, with a constant cross section, which makes the conduit 22 too long, and, since it needs to be rotating towards the direction of the wind around the vertical axis, the occupied area in horizontal plane will be accordingly increased. And the conduit should be made much longer because the angles of inclination of the conical surfaces for the body 55, as it shown for example, in FIGS. 5, 7, are too big and creating too much turbulence in the area of entrance with a possibility to completely block the entrance.

In U.S. Pat. No. 5,836,738, Finney describes an advanced super-venturi power source, comprising a series of at least three venturi tubes having an outlet of one tube positioned in the throat of the second tube, and the outlet of the second venturi tube in the throat of the third venturi. Finney also positioned one turbine in the throats of each one of the tubes, except from the fourth turbine, used as an accelerator for the wind flow from the first three venturi. The system looks very big and bulky, and it will become much bigger if we will include all the structures needed to hold the tubes one inside another and to turn the structure towards the wind. But, despite the fact that the system is relatively big, the output of the energy will be limited. A large generator and a gear box inside of the relatively small throat of the first tube will block the fastest wind streams. Each of the second and the third rotors is having only two blades and most of the wind will slip between the blades, carrying out most of the energy, accelerated by the system. The low efficiency of the chosen rotors, especially for the second and for the third stage is actually acknowledged by Finney in FIG. 1E and on page 27. The rotors of the second and the third stages combined have too small power compared with the rotor of the first stage. The relatively long blades as well as supportive structures, not shown in the drawing, but needed to support the rotors and generators, will cause a turbulent wind flow and an additional loss in efficiency. Despite that the system is relatively big, the output of the energy still will be limited.

In U.S. Pat. No. 4,320,304, Karlson et al, of Sweden, describes an apparatus for increasing the flow speed of a medium, comprising a series of concentric, symmetrically arranged annular members separated by annular slots. These slots can be used to decrease the loss of energy in venturi entrances and diffuser due to the turbulence caused by the restriction of the air by the conical surfaces of venturi. We decided that this patent can provide useful ideas for decreasing the turbulence of air, although our invention has only vertical contraction of the flowing air unlike the frusto-conical contraction of venturi. We provided in our invention new means for decreasing the turbulent flow of wind, and these means are easy to implement. These new means do not produce additional eddies because the restricting surfaces of our invention positioned in flat planes unlike the cited patent, having curved surfaces around the slots which will create additional turbulences. In FIG. 8, Karlson shows a diagram containing data obtained in experiments with the accelerator of FIG. 5. The data shows that at wind speed of 6 m/s, the power output from the turbine is less than $5 \times 10^{-3}$ watts. With an accelerator the power was 7 times bigger, reaching $35 \times 10^{-3}$ watts and with an accelerator and 4 mms water column pressure drop in the exit area, the power was more than $70 \times 10^{-3}$ watts, increasing the power more than 11 times. Karlson did not show how he achieved the drop of the pressure in the exit area, but in our invention we provided a very simple super-diffuser and a booster allowing achieving much bigger drop of air pressure, and at the same time, not increasing too much the dimensions of the device.

Foreign Patent 2,450,362, France, shows a propeller, mounted in a throat of a venturi type tube, having an entrance much bigger than an exit. This patent is similar to the already discussed U.S. Pat. No. 6,249,059, and has similar disadvantages common to patents having propellers mounted in venturi type tube.

Another foreign Patent 2,474,604, France, illustrates similar implementation of propellers, situated in a throat of venturi type tube. All these cited patents as well as many other, using accelerating means and propellers, utilizing the advantages of these accelerating means, have axes of rotation of the propellers positioned in direction of the wind and the blades rotating perpendicular to the direction of the wind, what creates an asymmetrical loading on the bearings and an additional force, pushing the axes of rotation in the direction of the wind, additional friction and a loss of energy to this friction. Most of the energy is slipping between and off the narrow twisted blades of the propellers. All the patents, utilizing the venturi as a means for accelerating the wind, constricting the wind from every direction into a frusto-conical surface, creating eddies and turbulence in every direction perpendicular to this surface, blocking the entrance to the throat of the venturi, especially if the angle of inclination is bigger than 30 degrees, as it is shown in the drawings of these patents. Most of the venturi of the patents has an equal area of exits and entrances, which do not provide suction into the throat of venturi.

In U.S. Pat. No. 6,538,340, Elder implements accelerating means, using narrow stator blades and claiming a new type of rotor, as specifically adapted for a high rotational speed. But, if we take a look at FIG. 1A of the patent, we can see, that large areas of the rotor blades from both sides of the central shaft are not covered from the wind and the stator blades creating only "tower shadowing" along the height of the rotating blades. So if the wind is blowing, for example, in the direction, shown by the reference lines to numerals 11, 12, 10a, to both sides of the central shaft, it will create one rotating torque, turning the rotor in clockwise direction, and another rotating torque, acting in counter-clockwise direction around the central shaft. The resulting torque will be equal to the difference between the two mentioned, and it can be too small to produce adequate energy. Additional resistance to rotate the rotor will come from the "exhaust" zone of the high pressure around the central shaft, creating friction with the blades. The blades, comprising a single, separately standing long plate can not transfer a large rotating torque at a high rotational speed, causing vibration and loss of stability of the rotor. Elder suggests to put his invention on the top of a high rise building. We don't think that people living in this building will approve this idea. The blades of the rotor are mostly not covered and will produce noise, blasts of wind and vibration. Also possible are electro magnetic and radio impulses and interferences which residents of the building will not approve.

U.S. Pat. No. 6,749,393, disclosed by Y. Sosonkina, one of the applicants of this new invention, can help in solving the problem of producing the electrical energy on a large scale by powerful rotors, positioned one above another in one housing, having horizontal axes of rotation, symmetrically loaded from both sides of the rotors and accelerated by an tunnel suction from a wind tail and by contracting the wind at the entrance to the wind tunnel. The only limitation of the previous invention is that it does not have as many means for accelerating the wind as the new invention, capable to increase the speed of the wind and the power of the rotor in hundreds times.

The new invention overcomes this limitation as well as and many others in cited patents. It has small but powerful rotors, capable to perform the work of rotors many times larger in size, avoiding damaging centrifugal forces and related stresses and malfunction. Instead of rotating the large rotors with large circumferential speed of the giant blades, the invention increases the speed of wind by stationary means, which do not demand special maintenance, treatments and replacements. The invention can work at almost any site and capable to work at a wind speed less than 5 miles per hour on the level near the ground. This invention can utilize a rotor train, having only one rotor with two generators, or a rotor train, equipped with six rotors and twelve generators. The rotor trains can be located near the ground or in a high rising building, include one rotor train or a lot of rotor trains, positioned one above another, and collect the electrical power of hundreds of kilowatts.

BRIEF SUMMARY OF THE INVENTION

The present invention disclose a wind and solar power plant with variable high speed rotor trains for producing the electrical energy on a large scale, capable of utilizing even the smallest wind at any available site and at every level above the ground.

A plurality of powerful, quiet rotors is collected in one building. These rotors will not harm the environment even in the surroundings of a large city, will protect the bird population and provide a pleasant aesthetic view. The building is having a base, a roof and a plurality of horizontal stability belts, spaced apart and distributed along an imaginary vertical axis of symmetry. Each of the stability belts is formed by an upper horizontal deck, a larger in horizontal dimensions lower deck and vertical walls, connecting the upper and the lower decks and providing an inner space for electrical and mechanical equipment, for storage and for maintenance and an outer space for balconies running around a perimeter of the lower deck. Both horizontal decks are having shape of a polygon with the same number of equal angles between vertical sides, and providing a floor for the space, located above and a ceiling for the space, located below of the decks.

A plurality of vertical pillars is secured between the stability belts, forming air concourses between the ceilings of the upper decks and the floors of the lower decks, these air concourses opened for the wind, blowing from every direction between the pillars and the stability belts.

A plurality of rotor trains is mounted in the building, one rotor train in each of the air concourses, each of the rotor trains is having an imaginary vertical plane of symmetry, passing through the vertical plane of symmetry, identifying one side of the rotor train, facing the wind, as a front side, and the opposite side, positioned in the direction of the wind, as the back side. Each of the rotor trains is equipped with:

(a) a turntable, mounted on the floor of the air concourse, rotated around a vertical axis concentric with the vertical axis of the building;

(b) a servomotor, turning the turntable towards the direction of the wind following the commands from a computer, connected with systems of positional sensors, mounted in the air concourse and on the roof of the building;

(c) a supportive structure, mounted on the turntable;

(d) a plurality of rotors, having horizontal axes of rotation perpendicular to the vertical plane of symmetry, positioned on bearing assemblies, mounted on the supportive structure above the turntable in an upper and in a lower lines;

(e) a hollow shroud, opened to the wind flow from the entrance, defined by the front side, to the exit, defined by the back side, mounted on the supportive structure and encasing the upper and the lower lines of rotors by opposite to each other an upper and a lower plates and two opposite to each other vertical walls, allowing the central half-shafts of the rotors to protrude through the vertical walls to the bearing assemblies;

(f) a wind tunnel, mounted inside of the shroud, said wind tunnel having a high, gradually converging in the vertical direction entrance to the wind, positioned in the entrance to the shroud, a contracted in the vertical direction by guiding plates low middle part, defined as a wind way, and a high and wide exit, gradually expanding in the vertical and the horizontal directions and positioned in the exit of the shroud.

The wind tunnel is covering from the wind most of the surface of the rotors, allowing at least one blade of each rotor to protrude in the wind way upwardly for the rotors of the lower line and downwardly for the rotors of the upper line. The blades of the rotors of the upper line are appearing in the wind way between the blades of the rotors of the lower line, allowing the rotors to discharge the air from the blades of one rotor in the direction of the back side of the wind tunnel towards the blades of the next rotor. The wind, blowing from the entrance through the wind way towards the exit, strikes on the blades of the rotors causing a rotation in the counter-clock wise direction for the rotors of the lower line, and in the clock-wise direction for the rotors of the upper line.

If we will take a look at FIGS. 3, 8, 9, 10, we can see that the wind tunnel is having the entrance from six to ten times higher than the wind way.

The air, pressed in the vertical direction in the wind way 140, will flow accordingly to the low of conservation of mass, which constitute that the mass of the air, entering into the entrance, is equal to the mass of the air, passing through the cross-section. The speed of this flow $V_2$ will be bigger, than the speed of the wind $V_1$ at the entrance of the wind tunnel 118, and the relation $V_2/V_1$ should be the same as the ratio between the height of the entrance 118 to the height of the wind way 140, since the width of the wind tunnel remain the same. If we will accept the heights as they are shown in FIG. 3, this ratio will be 6. The power of the wind is a cubic function of the speed of wind. The power output from a wind rotor can be defined by the usual equation (1)

$$P=0.5 \cdot Cp \cdot \rho \cdot A \cdot V^3 \text{ or } P=0.6125 A \cdot V^3$$

Where P—is a power output (Watts)
    Cp—power coefficient, usually about 0.4
    $\rho$—is the air density (about 1.23 kg/m)
    A—is the rotor swept area (m)
    V—is the wind speed (m/s)

If we compare the power of the same rotor rotating with two different speeds $V_2$ and $V_1$, we will receive the next equation (2)

$$P_2/P_1=(V_2/V_1)^3=6^3=216$$

This equation tells us, that a rotor will have 216 times more power if it will be placed in the wind tunnel of the invention, compared with the same rotor, placed in an ambient wind flow.

According to Betz limit, the efficiency of a wind rotor is limited to a little less than 60 percent of the power of the wind. We can, for safety, assume that we will lose half of the power of each rotor to friction, viscosity, turbulence and other factors. We can also assume that we will utilize 40 percent of the power of each rotor for producing electrical power and the remaining 60 percent will go to the next in the line rotor. So, the power of the first rotor will be equal to 216 conventional rotors (or c.r.). The power of the second rotor will be equal to 216×0.5×0.6=64 c.r. The power of the third rotor will be equal to 64×0.5×0.6=19 c.r. And the power of the fourth rotor will be 19×0.5×0.6=5 c.r. So, the power of the rotor train, having four rotors and shown in FIG. 3 will be equal to the power of 304 rotors of the same size, placed in the ambient wind. And we did not take into account the increase of the tunnel suction resulted in the lowering of the static air pressure at the exit of the wind tunnel. Actually, the implemented in the invention super-diffuser, the booster and other means can restore the speed of the wind, striking on the blades of the last in the lines rotor to the level of the speed of the wind that strikes on the blades of the first rotor.

The rotor train of the invention can work, for example, at the speed of the ambient wind less than 6 m/h. This speed is too low for most of the known devices that have large rotors. But this is the average speed of the wind, blowing mostly around the year at the levels near the ground at most of the territory of the US. This is why the wind companies looking for the windiest places for the power plants and building them at high elevations. Even a small increase in speed of the wind, for example, from 6 to 7 m/h, having increase 17 percent, creates 60 percent increase in power.

The invention, as we can see, can work at any site and at any level above the ground, increasing in many times the existing wind at this site. The wind tunnel, shown in FIG. 3 can be compared with a river, rushing fast between high and narrow banks after a slow motion along wide planes. All the water, which was flowing through this wide planes, should pass between the narrow banks, according to the law of continuous flow, so the speed of the wind between the narrow banks will be as many times faster, as many times the distance between the wide banks at the entrance will be bigger than the distance between the narrow banks.

In accordance with the ratio of contraction, shown in FIG. 3, which is about 6, the wind speed in the wind way 140 will be six times higher, than the ambient wind. For the speed of the ambient wind $V_1$=6 m/h, the speed of the wind in the wind way $V_2=V_1 \times 6$=36 m/h or 16 m/sec. For the area A=1 sq. meter, swept by the blades in the wind way with the $V_2=16$ m/sec. $P=0.6125\times16=2460$ Watts=2.4 kW.

If we choose to build a rotor, having the height of the blades 0.5 meters and the length of the blades 20 meters or the height of the blades 1 meter and the length of the blades 10 meters, the power of this rotor with the speed of the ambient wind only 6 miles per hour will be: $2.4\times10=24$ kW. For one rotor train, equipped with four rotors, the power will be equal to 96 kW. And for a rotor train, equipped with six rotors, the power will be equal to 144 kW.

If the speed of the ambient wind is 16 m/h, which is considered to be the lowest sufficient speed for the most known wind machines, the wind inside the wind way will be 96 m/h, or 42 m/sec. The power of the wind, swept from the area of 1 sq. meter is $P=0.6125\times42=44$ kW. And the power for only one rotor with the height of the blade 0.5 meter and the length of the blade 20 meters will be 440 kW, for the rotor train with 4 rotors 1760 kW, and for six rotors 2640 kW.

We can compare the results of these calculations with the data of the turbine build by NASA, MOD-O two bladed rotor, having diameter 125 ft. (38 m) and driving a 100 k. watts generator with the speed of the ambient wind about 18 m/h. The giant propeller, making 40 revolutions per minute, having speed at the end of the blade about 180 m/h, ten times bigger than the speed of the wind, causing this rotation, creating big centrifugal forces and stresses for the blades. This rotor can not work at speed less than 6 m/h, as well as many of the wind farms in California, raging with sizes from a few kilowatts to 200 kilowatts per machine, occupying large areas of land.

All this machines need wind of no less than 20 m/h to produce the average power from the electrical generators and, at the same time, there are long periods of time, when this machines will not work at all, since the average speed of the wind will be much less.

To ensure, that the wind will blow with such high speed all along the wind way, the invention has several innovations:

1. The exit of the wind tunnel has bigger cross-sectional dimensions than the entrance, which will create a gradual expansion of the air flowing out of the wind tunnel, to a volume, exceeding the volume which it had at the entrance, a drop in the static air pressure at the exit, increase the tunnel suction in the wind way and promote the wind flow from the entrance to the exit.

2. The wind tunnel, although it has a cross-sectional view along the vertical plane of symmetry similar to a venturi, has a shape of a rectangle in the cross-sectional view, perpendicular to the wind flow, so it contract the wind only in a vertical dimension between two converging nozzle panels, creating minimal disturbance and eddies for the wind streams. The known devices that use venturi for contracting the wind flow, mix-up different streams of the wind, pressed in the frusto-conical surface of venturi from every direction, and create numerous eddies and turbulence at the entrance to the venturi, especially if the angle of inclination at the entrance is too big.

3. The converging nozzle panels of the entrance of the wind tunnel having outer and inner plates, vertical and horizontal slots in the outer plates and some distance between the plates, allowing some of the air, striking on the plates, to pass through the slots and to flow to the wind way between the plates, breaking down possible eddies at the entrance.

4. A super-diffuser, providing an extended zone of low static air pressure for the exit of the wind tunnel and a tunnel suction in the wind way.

5. A booster, providing extensions to the areas of the entrance and the exit of the wind tunnel, increasing the contraction ratio of the wind tunnel and, at the same time, diminishing the eddies at the entrance and lowering the static air pressure at the exit.

6. A new type of rotor, capable to withstand any high rotational speed, to work in a succession with other rotors, and to transfer a large rotational torque towards electrical generators.

7. A symmetrically loaded horizontal positioning of the rotors, allowing high rotational speed on the radial bearing assemblies, having less possible resistance for the rotation and symmetrical distribution of the stress on the blades of the rotors.

8. Solar panels, fixed on the balconies from the east, south and west sides of the building, and tilted plates, mounted on the balconies from the north side of the building, deflecting the wind from the stability belts towards the air concourses, located above the stability belts. These panels and plates gradually contracting the wind streams, flowing towards the air concourses, increasing the speed of this wind streams, and gradually expanding the wind streams, flowing from the air concourses.

9. Already mentioned solar panels, mounted on the balconies and solar panels on the roof of the building, adapted for converting the solar energy into electrical energy and operationally coupled with power storage assemblies, positioned in the stability belts.

The electrical energy collected by these storage assemblies can be used for initial orientation of the rotor trains towards the direction of the wind.

Provided innovations are allowing to produce electrical energy greatly exceeding the energy, produced by the conventional wind turbines, that have much bigger and more expensive rotors, but not capable to work in the wide range of the wind speeds, suitable for the invention. The disclosed features of this invention are allowing to intercept most of the energy of the wind, blowing towards the whole area of the front side of the building, including the areas of the stability belts and the air concourses, and to concentrate this energy on the small areas of cross-sections of the wind tunnels, at the same time increasing the suction in these wind tunnels from the back side of the building.

Accordingly, an object of this invention is to provide a wind and solar power plant, capable to produce a large amount of inexpensive electrical energy in one building, not occupying too much land and not depending on the availability of the strong wind in the area.

Accordingly to the first objective, the invention provides a shroud and a wind tunnel, fixed in this shroud, capable to increase in many times any available on the site wind and, by encasing a plurality of rotors, covered between the shroud and the wind tunnel completely utilize the energy of the wind, accumulated in the wind tunnel.

Another object of this invention is to implement a new type of rotor, capable to withstand very high rotational speed, transfer large rotational torque and work quietly and smoothly. By implementing this new type of rotor, having a relatively small diameter, the invention achieved many other objectives, such as putting up to six rotors, connected with 12 electrical generators, in a place small for even one conventional rotor with one generator. The large conventional rotor, which will create big centrifugal forces and stress related failures, will require much more expenses for production, assembling and maintenance. The new type of rotor of the invention is suitable to work in consecutive line with other rotors, capable to work with wind of more than 100 miles per hour and resistant to any harsh conditions, such as ice, snow and rain. The new rotor will be durable and inexpensive in production.

Another object of this invention is to install symmetrically two generators to each rotor, so that each of the generators will be loaded with only a half of the rotating torque, will be smaller in size, less expensive and easier to install and maintain.

Another object of this invention is to provide a rotor, rotating in the direction of the wind on radial bearing assemblies, having very small resistance for this rotational movement.

Another object of this invention is to provide a fully computerized control of the work of the power plant. This control include constant monitoring of the rotational speed of the rotors, closing the entrances of the wind tunnels, providing idle rotation for some of the rotors, positioning of the rotor trains towards the prevailing direction of the wind.

Another object of this invention is to utilize the solar radiation in addition to the wind power to receive the electrical energy by installing solar panels on the balconies and on the roof of the building, realizing an additional source of energy when, for some reason, the electrical generators, driven by the wind, will be stopped.

Another object of this invention is to place the rotors behind the walls of the shroud, the wind tunnel, the decks of the building, the protective steel nets with the purpose to minimize the impact of the power plant on the surrounding environment, to reduce the noise, the electromagnetic impulses, the wind and the sun reflections and other factors, which can be attributed to the wind power plants, working in the open places under the impact of the ambient wind.

Other objects and advantages of the invention will become apparent from a consideration of the drawings and the description.

BRIEF DESCRIPTION OF THE SEVERAL VIEWS OF THE DRAWING

FIG. 20 is a top view of the rotor, assembled of modules, having angular shifted blades for each connected module.

FIG. 21 is a cross-sectional view, taken at the line 9—9 of FIG. 20 with a view of the blades of the connected module, shown by the phantom lines.

FIG. 22 is a schematic partial view of a conventional rotor with streamlined blades.

FIG. 23 is a schematic partial view of the rotor of the Invention.

FIG. 24 is a schematic cross-sectional view of the booster, taken at lines 15—15 of FIG. 8.

REFERENCE NUMERALS IN THE DRAWINGS

Figure 1:
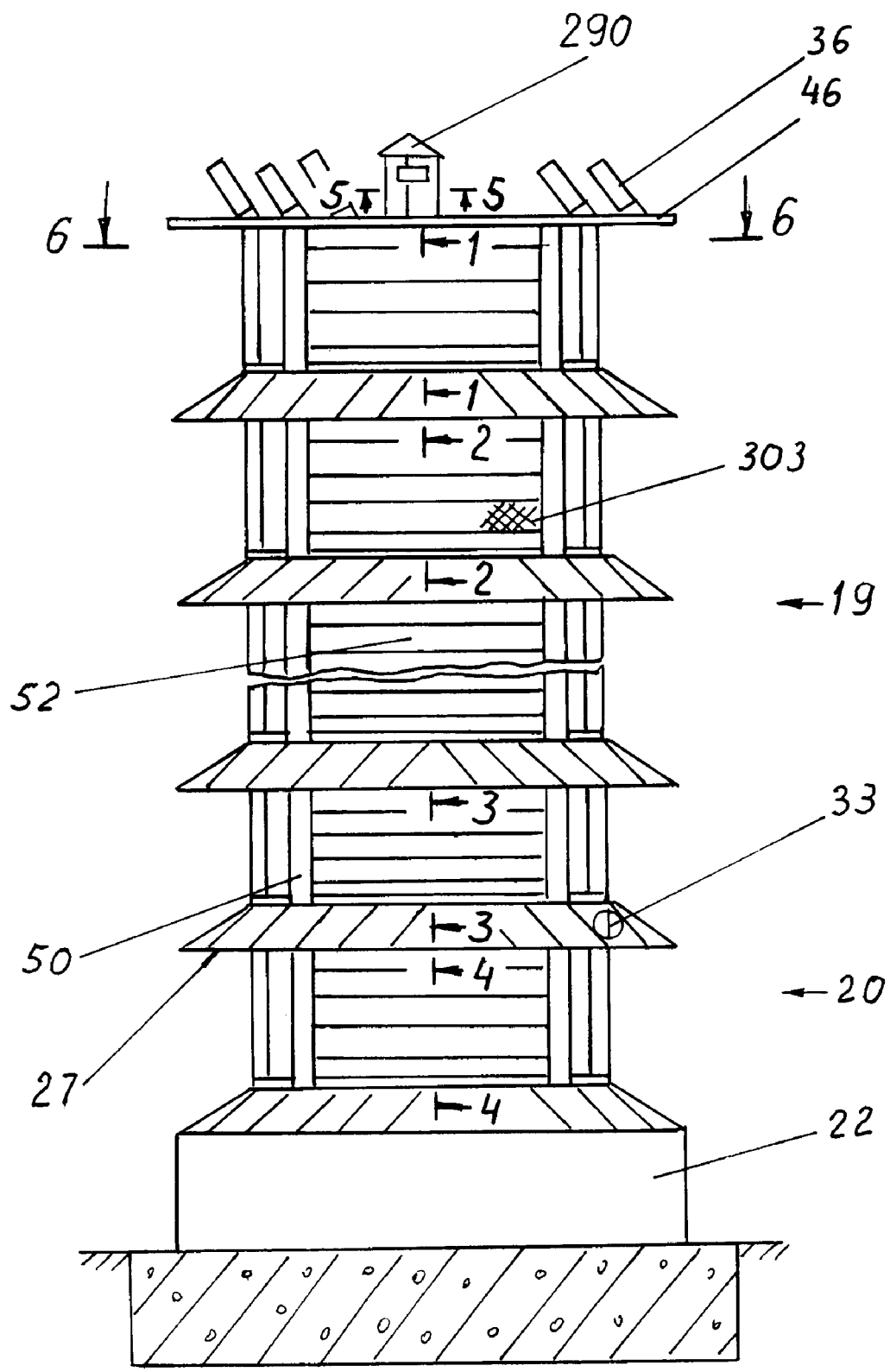
FIG. 1 is an elevation view of the power plant.

| | | | |
|---|---|---|---|
| 19. | power plant | 20. | building |
| 22. | base | 23. | vertical axis of symmetry |
| 24. | stability belt | 26. | upper deck |
| 27. | lower deck | 28. | vertical side of the upper deck |
| 29. | vertical side of the lower deck | 30. | ceiling |
| 31. | angle of the polygon | 32. | floor |
| 33. | vertical wall | 34. | balcony |
| 35. | door | 36. | frame |
| 37. | solar panel | 38. | cabin of the elevator |
| 39. | trailing rail of the elevator | 40. | rail of the elevator |
| 41. | stairs | 42. | inner space of the stability belt |
| 43. | computer | 44. | additional wall |
| 45. | power storage assembly | 46. | roof |
| 47. | tilted plate | 50. | pillar |
| 52. | air concourse | 54. | solar panel |
| 55. | rotor train | 56. | prevailing wind |
| 58. | turntable | 61. | servomotor |
| 62. | supportive structure | 63. | vertical plane of symmetry |
| 64. | lower line of rotors | 65. | upper line of rotors |

-continued

| | |
|---|---|
| 66. rotor | 67. horizontal axis of rotation of rotor |
| 68. bearing assembly | 70. first rotor of the lower line |
| 72. first rotor of the upper line | 74. second rotor of the lower line |
| 76. second rotor of the upper line | 78. blade |
| 80. front side of the blade | 82. back side of the blade |
| 84. outer circle of the rotor | 85. inner circle of the rotor |
| 87. perimeter of the rotor | 89. lateral module |
| 91. lateral disk | 92. fly wheel |
| 93. hub | 95. central half shaft |
| 97. electro magnetic clutch | 99. intermediate module |
| 101. bolts and pins | 103. inner disk |
| 105. electro magnetic clutch | 107. gear box |
| 108. clutch | 109. electrical generator |
| 110. sensor to control speed of rotor | 112. actuator |
| 113. bracket | 114. shroud |
| 116. super-diffuser | 118. entrance |
| 120. exit | 121. vertical wall of the shroud |
| 122. opening in vertical wall | 123. bending line |
| 124. front side of vertical wall | 125. back side of vertical wall |
| 126. upper side of vertical wall | 127. lower side of vertical wall |
| 128. bending vertical line | 129. horizontal part of plates 130, 131 |
| 130. upper plate of the shroud | 131. lower plate of the shroud |
| 133. front side of the plate | 134. back side of the plate |
| 135. lateral side of the plate | 136. diverging part of plates 130, 131 |
| 137. wind tunnel | 138. upper duct |
| 139. lower duct | 140. wind way |
| 141. lower nozzle panel | |
| 142. upper nozzle panel | 143. piston |
| 144. horizontal hinge | 145. upper pumping plates |
| 146. upper guiding plates | 147. lower guiding plates |
| 149. gap | 150. gap |
| 152. plate of the diffuser | 153. upper diverging plate |
| 154. lower pumping plate | 155. gap of the diffuser |
| 156. lower diverging plate | 157. entrance to super-diffuser |
| 158. exit of super-diffuser | 160. vertical diverging plate |
| 162. vertical diverging wall | 163. extended zone of super-diffuser |
| 164. supporting posts | 165. opening in vertical wall |
| 166. lower deflecting plate | 168. outer nozzle plate |
| 170. inner nozzle plate | 173. vertical slot |
| 174. horizontal slot | 176. exit from nozzle panel |
| 178. rotor train with three rotors | 179. rotor train with two rotors |
| 180. first rotor | 181. second rotor |
| 183. guiding plate | 184. air gap above first rotor |
| 185. air gap above second rotor | 186. streams of wind |
| 187. streams of wind | 188. outer circle |
| 189. inner circle | 190. wind way |
| 192. rotor | 193. rotor |
| 194. guiding plate | 195. guiding plate |
| 198. rotor | 200. rotor train |
| 201. rotor | 202. wind way |
| 203. wind tunnel | 204. booster |
| 205. entrance to wind tunnel | 206. exit from wind tunnel |
| 208. lower booster | 210. lower booster plate |
| 211. lateral walls of lower booster | 212. front side of lower booster |
| 213. lateral side of front plate | 215. inlet |
| 216. board | 218. narrow air diffuser |
| 220. outlet | 221. back booster plate |
| 222. upper booster | 224. plate |
| 226. vertical wall | 228. vertical wall |
| 230. rotor train with 6-rotors | 232. super-diffuser |
| 234. shroud | 235. booster |
| 237. rotor train with 6-rotors | 238. air gap |
| 239. outer circle of rotor | 240. rotor |
| 242. blade of rotor | 243. lower line of rotors |
| 244. upper line of rotors | 245. guiding plates |
| 246. entrance to wind tunnel | 247. exit |
| 248. cylindrical collar | 249. horizontal platform |
| 250. rail ring | 251. horizontal wheel |
| 252. bracket | 253. horizontal rail ring |
| 254. bearing assembly | 255. gear ring |
| 256. gear wheel | 257. vertical post |
| 258. bearing assembly | 260. horizontal rail ring |

-continued

| | |
|---|---|
| 262. horizontal wheel | 263. bracket |
| 265. horizontal rail ring | 268. large circle of sensors |
| 269. actuator | 270. bracket |
| 272. rotor | 273. rotor |
| 274. rotor | 275. rotor |
| 276. module | 277. lateral disk |
| 278. blade | 280. rotor |
| 281. lateral module | 282. intermediate module |
| 283. lateral disk | 284. blade |
| 285. front side of blade of one module | 286. front side of blade of another module |
| 290. wind finder | 291. small roof |
| 292. perimeter of small roof | 293. center of symmetry of small roof |
| 294. vertical support | 295. plate |
| 296. axle | 297. weather vane |
| 298. actuator | 300. small circle of sensors |
| 303. steel net | |

FIG. 1 illustrates a view in elevation of the power plant, generally indicated by the numeral 19. A building 20 is mounted on a strong base 22. The building 20 is erected symmetrically around an imaginary vertical axis 23. The first stability belt 24 is shown at the lower level near the base 22.

Figure 16:
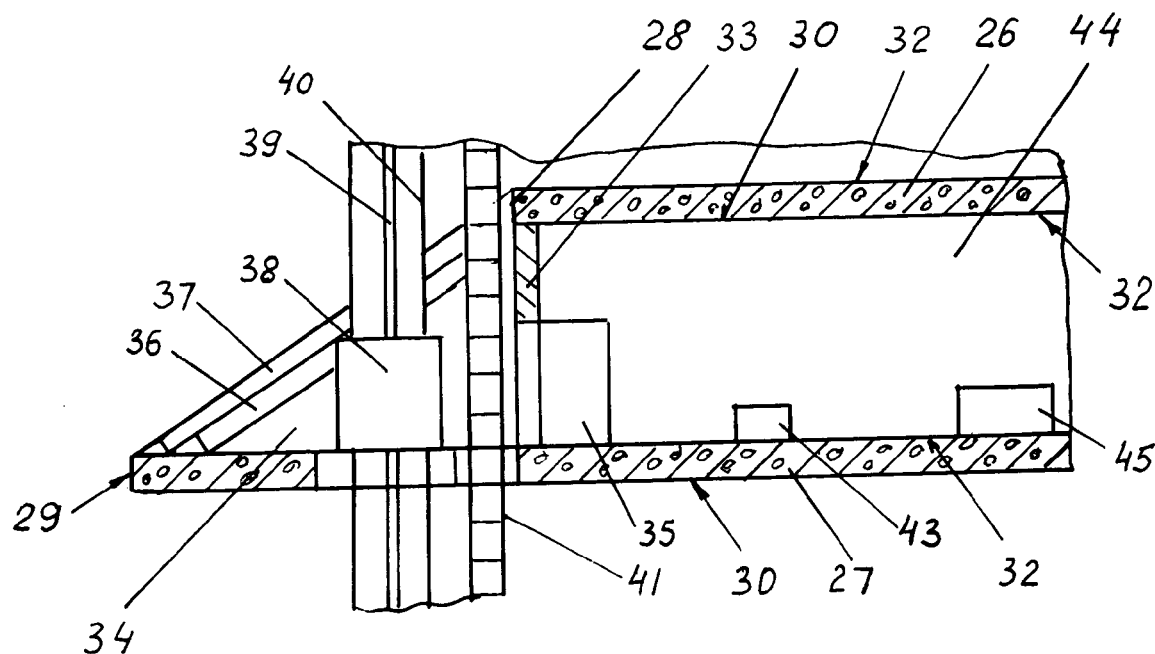
FIG. 16 is a partial cross-section of one of the stability belts, depicting the balcony, the solar panels, the elevator and the stairs.

To better illustrate the stability belt 24, we can first take a look at FIG. 16, which depicts an upper horizontal deck 26 and a lower horizontal deck 27. Both decks positioned symmetrically relative to the vertical axis 23 and to each other. The upper deck 26 is having shape of polygon with equal vertical sides 28 and equal angles 31 between the vertical sides 28. The vertical sides 28 define a perimeter of the upper deck 26. The lower horizontal deck 27 is also having shape of a polygon, similar to the shape of the upper 26, with the same number of equal angles 31 between the vertical sides 29, but the lower deck is having a bigger size of the vertical sides 29, and, as a result, a bigger perimeter along the vertical sides 29. Both decks are having an upper horizontal surface 30 and a lower horizontal surface 32. These surfaces are providing a floor 30 for the space, located above the deck, and a ceiling 32 for the space, located below of the deck. A vertical wall 33 is connecting the ceiling 32 of the upper deck 26 with the floor 30 of the lower deck 27 along the perimeter of the upper deck 26 and forming a balcony 34 around the building 20, doors 35 allowing access to the balcony 34. The perimeter of the upper deck 26 is smaller than the perimeter of the lower deck 27 in such a way, that it provides a bigger distance from the vertical side 29 of the lower deck 27 to the vertical wall 33, than the height of the vertical wall 33. The size of the balcony 34 provides a possibility to position inside of the balcony 34 solar panels 37, mounted on frames 36.

In FIG. 16 we can also see a cabin of the elevator 38, trailing rails of the elevator 39 and 40 and stairs 41. The inner space 42 inside of the stability belt 24 can be used for electrical and mechanical equipment, as a storage facility and for maintenance. The computer 43 is controlling the work of the power plant as it will be shown later. Additional vertical walls 44 can be mounted inside of the stability belt 24 to provide more rigidity and integrity to the structure.

Returning now to FIG. 1, we can see a plurality of stability belts 24, similar to shown in the FIG. 16, positioned horizontally one above another along the height of the building 20 symmetrically relative to the imaginary vertical axis 23 and distributed between the base 23 and the roof 46, positioned at some point of the vertical axis of symmetry, defining the height of the building. A plurality of vertical pillars 50 (see also FIG. 2), is secured between the decks 26 and 27 near the angles 31 of the polygons and providing integrity to the building. The exact number of the vertical pillars 50 and their cross-sectional size is chosen minimal for providing the stability for the building 20 and, at the same time, to provide less possible interference with the wind flowing between the pillars. A plurality of air concourses 52 is formed along the height of the building 20 between the vertical pillars 50 and the stability belts 24. These air concourses 52 are similar to the parking decks of a multistoried garage without any outer barriers, wide opened for the flow of the wind from every direction. Each of these air concourses is having a ceiling 30, provided by the lower deck 27 of the stability belt 24, and a floor, provided by the upper deck 26 of the stability belt 24. The ceiling 30 is covered with a laminated layer for less friction with the wind flow 56. On the roof 46 we can see additional solar panels 54, fixed by known means, allowing turning the panels towards the sun during the different time of the day. A plurality of rotor trains 55 is mounted in the building 20, one rotor train 55 in each of the air concourses 52.

Figure 2:
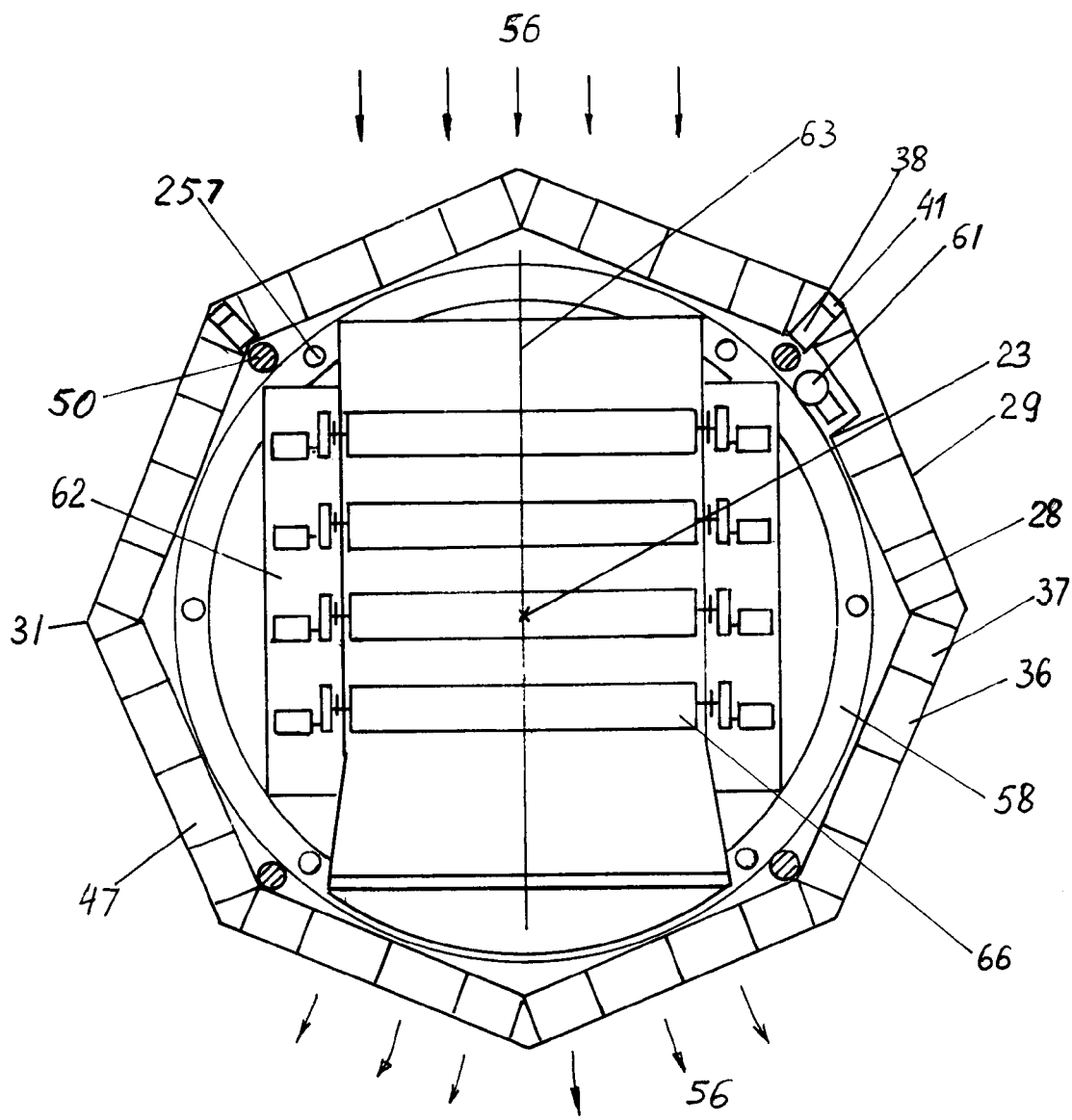
FIG. 2 is a cross-section of the power plant, taken at the lines 6—6 of FIG. 1 with a view of four rotors, eight electrical generators, the shroud, the turntable and the solar panels.
Figure 3:
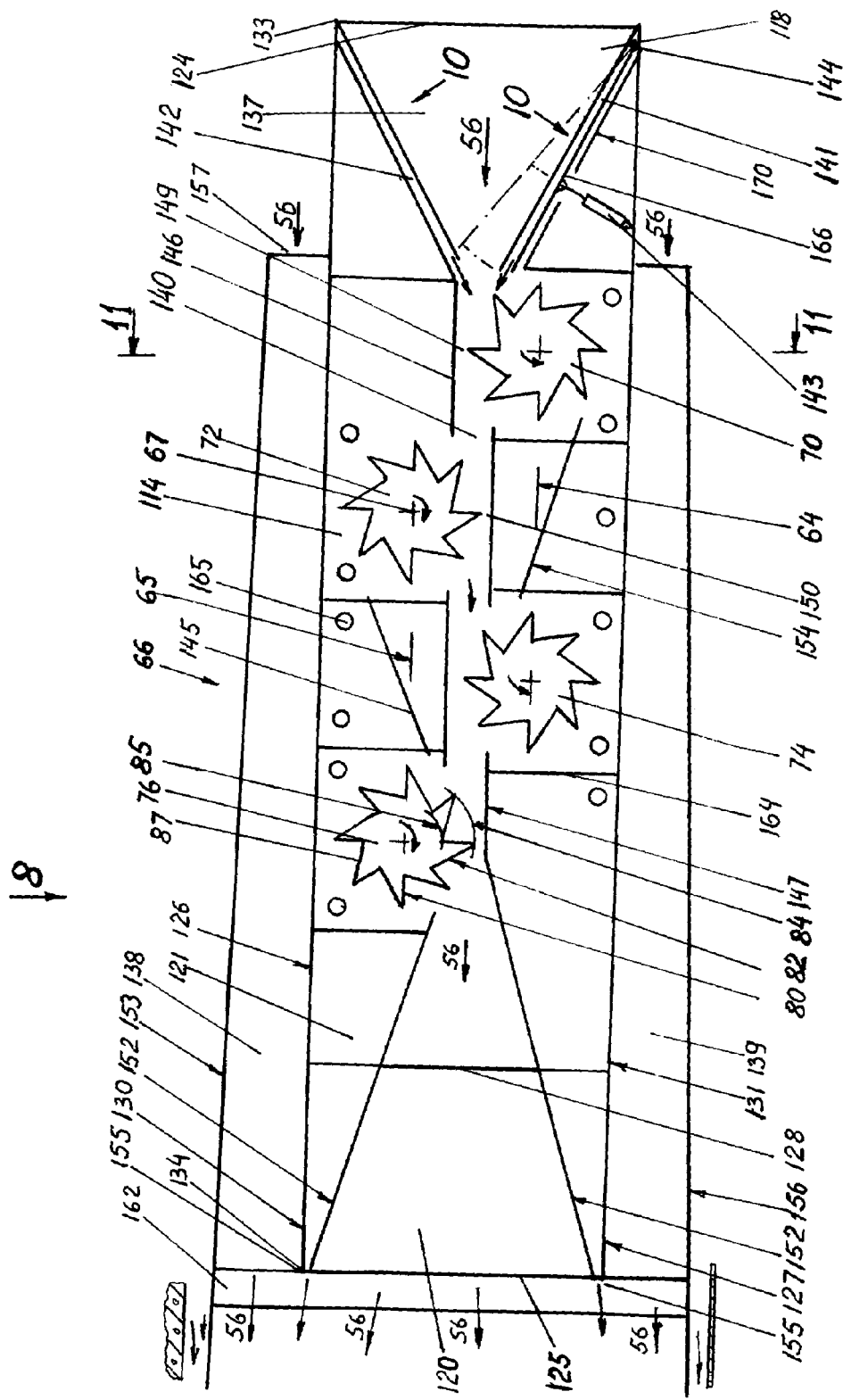
FIG. 3 is a cross-sectional view at lines 1—1 of FIG. 1 showing the shroud, the booster, the wind tunnel and four rotors.
Figure 11:
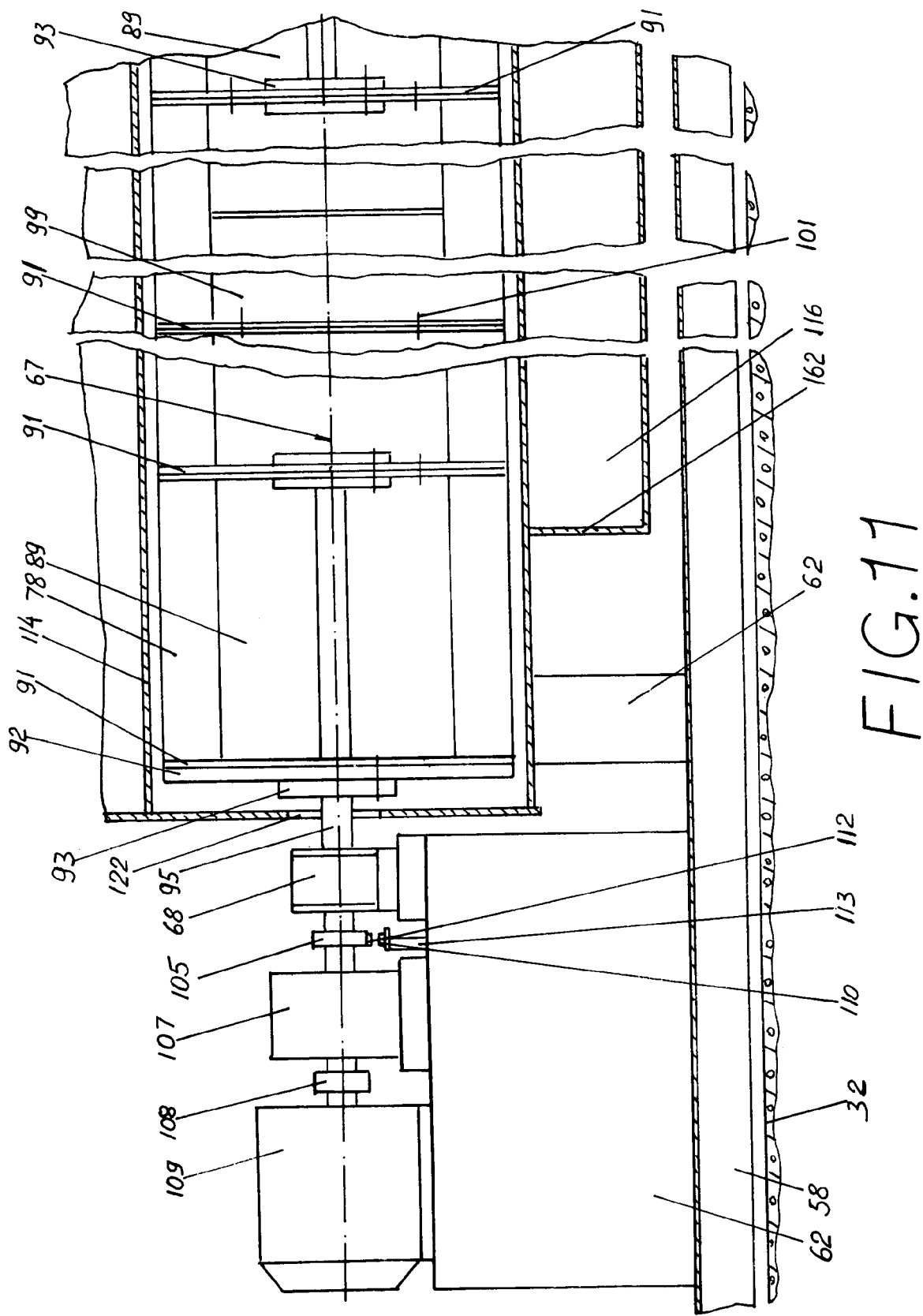
FIG. 11 is a cross-section of one side of the rotor train, showing the turntable, supportive structure, the shroud, the rotor and the electrical generator with a view of the air concourse.

To better understand the design of the rotor train 55, we can turn to FIGS. 2, 3 and 11. We can see the pillars 50, the vertical sides of the decks 28 and 29, the tilted plates 47, the solar panels 37 and the frames 36. The prevailing wind is shown by the numerals 56. A turntable 58 is rotated on the floor 30 by a servomotor 62 around the vertical axis 23 towards the prevailing direction of the wind 56 under the commands from the computer 43. A supportive structure 62 is mounted on the turntable 58 symmetrically relative to an imaginary vertical plane of symmetry 63, crossing the axis 23. A lower line 64 and an upper line 65 of rotors, generally indicated by the numeral 66, having horizontal axes of rotation 67, are mounted on bearing assemblies 68 on the supportive structure 62. Each line of rotors comprise a plurality of rotors 66, mounted at even distance from each other symmetrically relative to the imaginary plane of symmetry 63 on two horizontal levels above the turntable 58, the upper line 65 positioned at some vertical distance from the lower line 64. The lines 64 and 65 of the rotors 66 are positioned in such a way, that the first rotor 72 of the upper line 65 appears partially above and partially behind of the first rotor 70 of the lower line 64. All the other rotors of both lines are positioned respectively behind the first rotors. The bearing assemblies 68 are mounted on two horizontal levels above the turntable 62 respective to each of the lines 64 and 65. All the rotors 66 are adapted for high rotational speed and are equipped with blades 78, having a shape of a triangular prism with two sides, one of which, shown by the numeral 80, defines a front side of the blade, and the other, shown by the numeral 82, defines a back side of the blade 78. The front side of the blade 80 is positioned on a part of a radius from the horizontal axis of rotation 67 and has an outer end, defining the outer circle of the rotor 84 and an inner end, defining an inner circle of the rotor 85, the distance between these two circles defines the height of the blade 78 and the height of the front side 80 of the blade 78. The back side of the blade 82 is connecting the outer end of the front side 80 of one blade with the inner end of the front side of the adjacent blade, creating a streamlined surface between the adjacent blades 80 and forming a closed perimeter 87 of the rotor. This closed perimeter 87 will not allow the wind to penetrate inside the rotor and into the zone of the horizontal axis of rotation 67. This perimeter makes the rotor rigid and balanced, allowing high rotational speed and high rotating torque.

The number of the blades 78 is chosen to be sufficient to leave at least one blade outside of any tangential plane to the inner circle 85 of the rotor 66. The first rotor 70 of the lower line 64 positioned farthermost of the vertical axis of rotation 23 and has the front sides of the blades 80 facing the prevailing wind 56 above the horizontal axis of rotation 67. The second rotor 74, as well, as the other rotors of the lower line 64, also faces the wind in the same manner as the first rotor 70, facing the wind 56 with the front sides of the blades located above the axes 67. The rotors 72 and 76 of the upper line 65 are facing the wind having the front sides of the blades 80 located below the axes 67.

The blades 80 can be made of thin sheet metal, bent at the lines of the outer circle 84 and inner circle 85. The blades 80 also can be made of metal vanes, welded at the lines of connection of the adjacent blades. The blades can be also made of light weight laminated sandwich panels, having at least two laminated layers, or of some other contemporary strong, durable, rigid and light materials. All the outer surfaces of the blades should be made of material that has less possible coefficient of friction with the air currents.

To better understand the design of the rotor 66, we can take a look once again at FIG. 11. The rotor 66 can have a long length, for example 60 feet, and to make it easier to manufacture and assemble, the rotor can be divided into several modules. The first of the modules 89 is positioned from one lateral side of the rotor 66, and has two lateral disks 91, blades 78 fixed between these disks, hubs 93 are connected with the disks and with a flywheel 92. A central half-shaft 95 is connected with the disks 91, supported by the bearing assemblies 68 and connected with an electromagnetic clutch 105. A second lateral module 89 (not shown) is positioned from another side of the rotor 66 and connected with another electromagnetic clutch in the same manner. A plurality of intermediate modules 99 are connected together and fixed between the first and the second modules 89. All the lateral modules 99 having lateral disks 91, allowing the modules to be connected by bolts and pins 101, providing to the rotor stability and rigidity to transfer the rotating torque, intercepted by the blades 78, fixed to the disks 91. Smaller inner disks 103 are fixed inside of the modules to provide additional rigidity to the rotor 66. Tubes (not shown) can be inserted inside of the modules instead of the dicks to provide more rigidity to the rotor.

In FIG. 11 we can see the means for transferring the rotational torque from the rotor and for receiving the electrical power, including a gear box 107, a clutch 108 and an electrical generator 109.

Another, symmetrically positioned electrical generator, shown in FIG. 2, is located from another side of the rotor.

In FIG. 11 we also can see a sensor 110 for controlling the rotational speed of the rotor 66, fixed on a bracket 113, an actuator 112, activating this sensor and attached to the electromagnetic clutch 105, a shroud 114 and a super-diffuser 116, which we will discuss in a greater detail later.

Returning once again to FIG. 3, we can see that both lines of the rotors 66 are encased by a shroud 114. The shroud 114 is shaped as a hollow conduit, having an upper side, a lower side, two opposite to each other lateral sides and two opened to the wind flow opposite to each other vertical sides, one of them defining an entrance 118, and the other defining an exit 120 of the shroud 114. The two opposite to each other lateral sides define vertical walls 122 of the shroud 114. This vertical walls are spaced apart symmetrically parallel to the vertical plane of symmetry 63 between the bearing assemblies 68 and the side disks 91 of the rotors 66, allowing the half-shafts 95 to protrude through openings 122 in the vertical walls 121 and having a front side 124, a back side 125, an upper side 126 and a lower side 127. The shroud is having a rectangular cross section perpendicular to the wind flow and the vertical plane of symmetry 63.

For the purpose of not to overcrowd the drawings with too many references, it will be understood that all parts of the rotor trains are positioned symmetrically to the plane of symmetry 63, identifying the side, facing the wind 56 as a front side, the opposite side, positioned in the direction of the wind, as a back side and the sides, lying from both sides of the plane of symmetry 63, as lateral sides.

Figure 4:
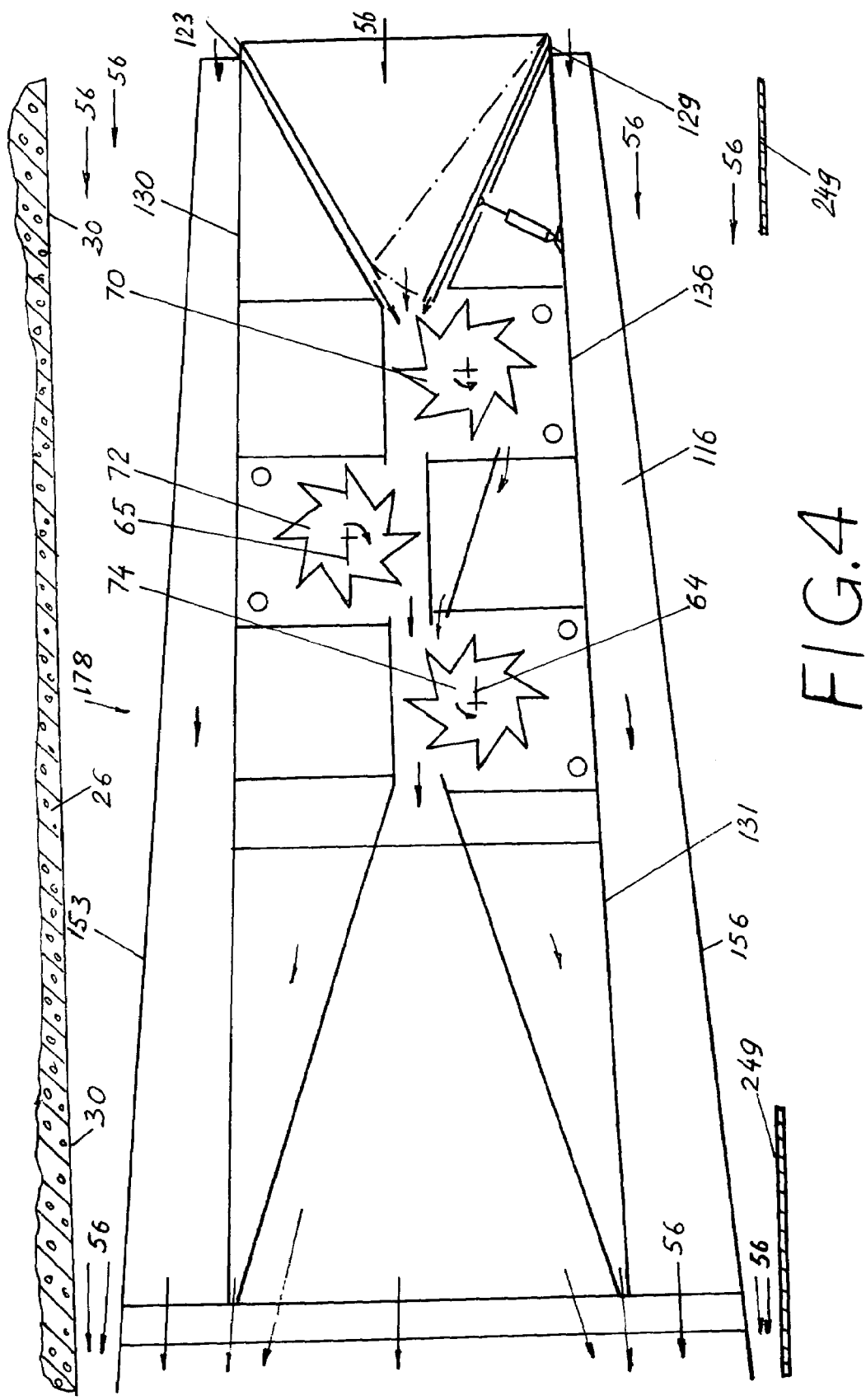
FIG. 4 is a cross-sectional view at lines 2—2 of FIG. 1, depicting the shroud, the booster and three rotors.
Figure 7:
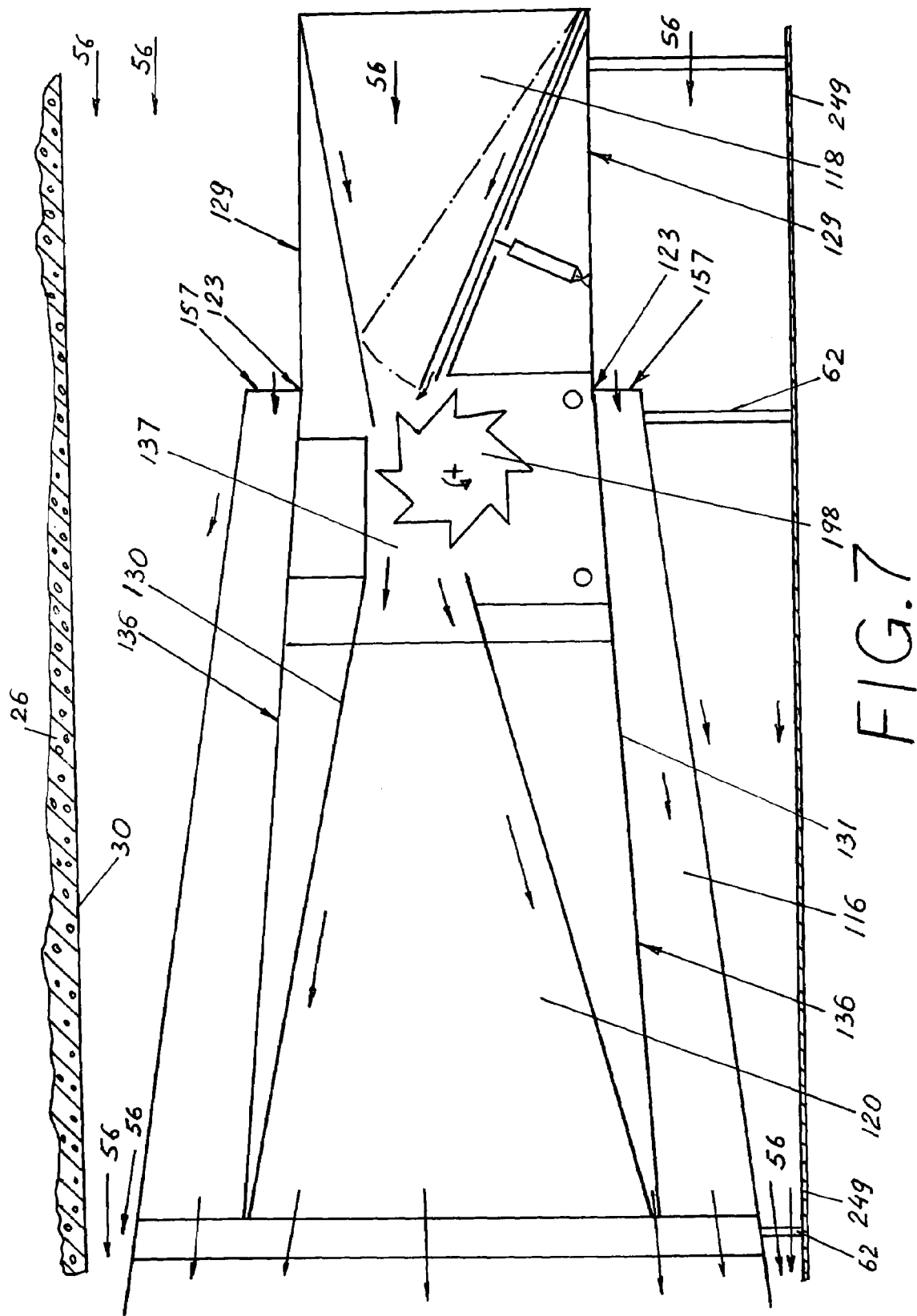
FIG. 7 is a cross-section of the rotor train, taken at lines 4—4 of FIG. 1 depicting the shroud, encasing one rotor.

If we will take a look at FIGS. 2 and 21, we can see, that the vertical walls 121 are bent at vertical lines 128 behind the last rotor 66 and diverged laterally outwardly symmetrically to each other in the direction of the back side 125 at an angle no bigger than 15 degrees from the vertical plane of symmetry 63. An upper plate 130, defined by the upper side of the shroud 114, and a lower plate 131 are connecting the vertical walls 121, encasing both lines of the rotors 66. The plates 130 and 131 are having a front side 133, a back side 134 and two lateral sides 135 partially diverged laterally outwardly to the back side 134 to adapt the vertical walls 121. The upper plate 130 positioned at some distance from the ceiling 30 and the lower plate 131 positioned at some distance from the platform 249 of the turntable 58, providing an open space for an unobstructed wind flow. The horizontal distance between the front sides and the back sides of the plates 130, 131 define the length of the plates. Both plates 130 and 131 are having a horizontal part 129, and the remaining part 136 diverges backwardly at an angle between zero and 15 degrees at the bending line 123 where the plate 130 points upward and plate 131 points downward. The vertical distance between the front sides of the upper plate 130 and the lower plate 131 defines a height of the entrance of the shroud, and the distance between the back sides of these plates defines a height of the exit of the shroud. The height of the exit from the wind tunnel can be equal to the height of the entrance as shown in FIGS. 3, 5, 8, 9, 10 where the angle of inclination of the upper plate 130 and the lower plate 131 is chosen equal to zero. The embodiments where the height of the exit is bigger than the height of the entrance are shown in FIGS. 4, 7. The angle of divergence shown in these figures is around 8 degrees.

A wind tunnel 137 is mounted inside of the shroud 114 between the vertical walls 121 and the plates 130 and 131. The wind tunnel 137 is having an entrance 118, located at the entrance of the of the shroud and actually replacing it and, therefore, depicted by the same number 118, a contracted in the vertical direction low middle part, defined as a wind way 140, and an exit 120, replacing the exit of the shroud 120. The entrance to the wind tunnel 118 also can be characterized as a nozzle, having the same reference numeral. It has gradually inclined to each other and contracting the wind flow in the vertical direction a lower nozzle panel 141 and an upper nozzle panel 142. The lower nozzle panel 141 and the upper nozzle panel 142 both have a front side, a back side and two lateral sides. The lower nozzle panel can be rotated around horizontal hinges 144, fixed to the lower plate 131 near the front side 133. The back side of the lower nozzle panel 141 is positioned with a gap to the outer circle of the first rotor 70 and with small gaps between the lateral sides of the panel 141 and the walls 121.

The lower nozzle panel 141 is supported by a power drive, more specifically defined as pistons 143, regularly located in a lower position, so that the lower nozzle panel will have no bigger than 40 degrees and preferably about 30 degrees with the horizontal level, having the back side of the panel 141 above the horizontal level of the axis of rotation 67 of the first rotor 70 and near the horizontal level of the inner circle 85. Such positioning of the lower nozzle panel 141 allows to changeably cover from the wind the entrance 118 of the wind tunnel 137. Such positioning of the panel 141 also allowing to cover from the wind most of the blades of the first rotor 70, leaving opened to the wind only several blades above the horizontal axis or rotation 67 above the back side of the lower nozzle panel 141. The lateral sides of the upper nozzle panel 142 are fixed to the vertical walls 121 and the front side of the panel 142 is fixed to the front side of the upper plate 130. The back side of the upper nozzle plate 142 is declining to the horizontal level of the inner circle of the first rotor 72 of the upper line of rotors 65 and slightly above the upper horizontal level of the outer circle of the first rotor 70 and before this outer circle. The angle of inclination of the upper nozzle panel 142 from the horizontal level is chosen no bigger than 25 degrees.

The wind way 140 of the wind tunnel 137 include an upper line of guiding plates 146, fixed at the horizontal level below the horizontal axes of rotation 67 of the rotors of the upper line and above the outer circles of the rotors of the lower line, and a lower line of guiding plates 147, fixed at a horizontal level above the axes 67 of the rotors of the lower line and below the outer circles of the rotors of the upper line line. All the guiding plates are fixed to the vertical walls 121 of the shroud 114 and supported by posts 164. Each one of the rotors in the lower line 64 is having a guiding plate of the upper line 146, opposing the rotor with an air gap 149 between the surface of the guiding plate 146 and the outer circle 84 of the rotor, and, similar, each rotor in the upper line 65 is having an opposing with a small air gap 150 guiding plate of the lower line 147. Each of the guiding plates 146 and 147 is having an inner and outer surface, a front side, a back side and two lateral sides. The first of the guiding plates of the upper line connect the front side thereof with the back side of the upper nozzle panel 142, all other guiding plates of the lines 146 and 147 are mounted with gaps to the outer circles 84 of the rotors 66, allowing the rotors to rotate freely between the front and the back sides of the guiding plates, having at any time at least one blade of each rotor protruding into the wind way 140 between the guiding plates downwardly for the rotors of the upper line 65 and upwardly for the rotors of the lower line 64, causing rotation of the rotors of the upper line in a clock-wise direction and in a counter-clock-wise direction of the rotors of the lower line 64.

The wind way 140 can be characterized as having a cross-sectional shape of a low rectangle with a height equal to the vertical distance between the guiding plates 146 and 147, and the width equal to the distance between the vertical walls 121 of the shroud 114, which will be slightly bigger than the length of the rotors 66. The wind way 140 also can be characterized as providing a possibility for narrow streams of wind to flow unobstructed through the air gaps 149 and 150 between the guiding plates 146 and 147 and the outer circles 84 of the rotors 66, opposing these guiding plates. This unobstructed movement of streams of wind above and below of the blades of the rotors of both lines involve by frictional forces in faster movement different streams of air, discharged from the blades of the rotors 66, located on the front side of the rotor train, creating an additional increase of speed for the wind streams, striking on the blades 78 of the rotors located on the back side of the rotor train.

The exit 120 of the wind tunnel 137 can be also defined as a diffuser 120, having two plates 152. These plates are gradually diverging from each other and from the wind way 140 in the direction of the back sides of the upper plate 130 and the lower plate 131, leaving narrow air gaps 155, allowing the air, pumped inside of the areas between the shroud 114 and the wind tunnel 137 by the rotating rotors 66, to escape through these gaps 155 like through two nozzles, creating an additional suction from the wind tunnel 137. The lateral sides of the plates 152 are adapted to connect the vertical walls 121, partially diverged in the area of the exit 120; one of the plates 152 is connected with the back side of the last of the guiding plates, the other has the front side thereof located close to the horizontal level of the axis of rotation of the last in the line rotor 66 and close to the outer circle 84 of this rotor. Both back sides of the plates 152 of the diffuser 120 and the diverged parts of the vertical walls 121 provide an enlarged area of the exit 120, gradually expanding in vertical and horizontal direction compared with the area of the entrance 118, which is expanding only in vertical direction. This enlargement of the area of exit 120 creates a zone of lower static air pressure, causing additional tunnel suction for the wind flow from the wind way 140.

In FIG. 3 we can see lower pumping plates 154, positioned between the outer circles of the rotors of the lower line 64 beneath the guiding plates 147. The lower pumping plates are having a front side, a back side, an upper surface, a lower surface and two lateral sides; these lateral sides, fixed to the vertical walls 121 of the shroud 114 and the middle parts of the pumping plates 154, are supported by the posts 164. The front sides are positioned below of the horizontal axes of rotation 67 of the rotors 66, and the back sides are positioned close to the back sides of the lower guiding plates 147. The lower pumping plates 154 are allowing to direct the air, discharged from the blades of the rotors located from the front side of the wind tunnel towards the blades of the rotors, located next in the line in the direction of the back side of the wind tunnel above the axes of rotation of these rotors along the upper surfaces of the pumping plates 154. Similar, the air, discharged from the blades of the rotors, located from the back side, is directed towards the blades of the rotors of the front side along the lower surface of the lower pumping plates 154.

The upper pumping plates 145 are positioned between the outer circles of the rotors of the upper line 65 above the guiding plates 146. Similar to the lower pumping plates, the upper pumping plates also have front sides, back sides, upper and lower surfaces and lateral sides. The lateral sides of the plates are also fixed to the vertical walls 121, the front sides are fixed above the horizontal axes of rotation 67 of the rotors and the back sides are fixed close to the back sides of the upper guiding plates.

The work of the upper pumping plates 145 is similar to the work of the lower pumping plates 154. The upper pumping plates 145 are allowing to direct the air, discharged from the blades of the rotors of the front side in direction of the rotors of the back side along the lower surface of the guiding plates 145 and to direct the air to the rotors of the front side above the upper surface of the plates.

The pumping plates 145 and 154 are allowing to redistribute the air, pumped by the blades of the rotating rotors, in the space between the wind tunnel 137 and the shroud 114, increasing the efficiency of the rotors.

Now we can discuss the super-diffuser 116, shown in FIGS. 3, 11 and 21.

In FIG. 3 we can see a cross-section of the power train along the plane of symmetry 63 and along the length of the super-diffuser 116, partially encasing the shroud 114 from the side of the upper plate 130 by an upper duct 138 and from the side of the lower plate 131 by a lower duct 139. The upper duct 138 include an upper diverging plate 143, positioned symmetrically to the vertical plane of symmetry 63 and two vertical diverging plates 160, forming together with the upper plate 130 a narrow entrance 157 for the wind 56, gradually expanding in vertical and horizontal dimensions air passage and an exit 158. The upper diverging plate 153 is having a front side 157, two diverging lateral sides 160, and a back side 158. The vertical diverging blades 160 are positioned in vertical planes, passing through the diverged parts of the vertical walls 121. The front side 157 positioned parallel to the front side 133 of the upper plate 130 and ahead of the first rotor 70 and at some distance from the upper plate 130. The upper diverging plate 153 is gradually diverging from the plate 130 at an angle no bigger than 12 degrees. The diverging lateral sides 160 are positioned above the diverging parts of the lateral sides of the plate 130, coinciding with these parts and outstretched behind these parts. The back side 158 is cut at a maximum radius, allowing the super-diffuser to fit at the turntable 58 when it will rotate between the pillars 50. The back side 158 is positioned above and behind the back side 134 of the upper plate 130, having a part of the plate 153 overlapping the back side of the plate 130. The lateral vertical diverging plates 160 are connecting the upper diverging plate 153 with the upper plate 130 and with the upper sides 126 of the vertical walls 121.

The lower air duct 139 is identical to the upper duct 138, positioned below of the plate 131 and shearing the same footprint with the air duct 138. Two vertical diverging walls 162 are extending the vertical walls 121 and connected to the back sides of these walls and to the overlapping parts of the upper and the lower diverging plates 153 and 156, closing the perimeter of the extended zone 163 of the exit 120 of the wind tunnel 137 within the plates 153 156 and 162.

The super-diffuser 116 provides the inner surfaces of the diverged plates 153,156, 160 and 162 for directing the flow of the wind inside of the air ducts 138 and 139 and the perimeter of the extended zone of the exit 120, and the outer surfaces of these plates for digressing the ambient wind streams, blowing along these outer surfaces above, below and along the lateral sides of the super-diffuser 116. In addition, the super-diffuser 116 is contracting these wind streams between the plate 153 and the ceiling 30 and between the plate 156 and the horizontal platform 249 of the turntable 58 (see FIG. 4). The digressed and contracted wind streams are increasing their speed and lowering the air pressure around the extending zone 163 of the exit 120, providing additional tunnel suction for the wind tunnel 137. All the mentioned plates and walls of the super-diffuser 116, as well as the parts of the shroud 114 and the wind tunnel 137 are made of durable, strong and rigid material, having less possible coefficient of friction with the wind flow.

Returning once again to FIG. 3, we can see the posts 164 fixed to the plates 130 and 131 to hold the guiding plates 146, 147 and the pumping plates 145,154. A plurality of openings 165 in the vertical walls 121 allows some of the air, pumped inside of the inner space of the shroud, to blow towards the electrical generators 109, providing cooling effect. In FIG. 3 at the entrance 118 of the wind tunnel 137 we can see a lower deflecting plate 166, covering the first rotor 70 while the lower nozzle panel 141 will be lifted by the pistons 143.

Now we can discuss the nozzle panels 141 and 142. We can see the view of the mentioned panels shown at the arrows 10 taken at FIG. 3 in FIG. 26. Both nozzle panels have a similar design and have an outer plate 168 and an inner plate 170. Each of these plates has a shape of a rectangle with a front side, a back side, two lateral sides and two flat surfaces. The outer nozzle plate 168 is having a plurality of vertical 173 and horizontal 174 slots, cut through the flat surfaces thereof, the outer nozzle plate 168 and the inner nozzle plate 170 have their flat surfaces fixed parallel to each other and at some distance from each other along the lateral and the front sides of both plates, leaving a narrow rectangular exit 176 to the wind way 137. The slots 173 and 174 and the air passages 175 provide a possibility for some air streams to pass between the flat surfaces of the plates 168 and 170 towards the blades of the firs rotor 70, at the same time breaking down possible eddies of the air in the entrance 118. The blade 178 of the lower nozzle panel 141 is designed to be lifted by the pistons 143 while rotating around the hinges 144, changeably closing the entrance 118. The completely closed position of the exit 118 is shown by the phantom lines. The plate 170 is fixed permanently to the shroud 114.

The rotor train 55, shown in FIG. 3, contains four rotors 66, with two rotors positioned in the lower line 64 and two rotors positioned in the upper line 65. This rotor train can be located at the upper levels of the building 20, facing the strongest winds of the higher elevation.

FIG. 4 shows a rotor train 178, located in the middle part of the building 20. This rotor train is having three rotors, two rotors in the lower line 64 and one rotor in the upper line 65. The rotor of the upper line 65 is located partially above and partially behind of the first rotor 70 of the lower line 64. The height of the exit is larger than the height of the entrance. The entrances 157 to the super-diffuser 116 are shown at the bending line 123 and situated close to the front sides of the upper 130 and lower 131 plates.

Figure 5:
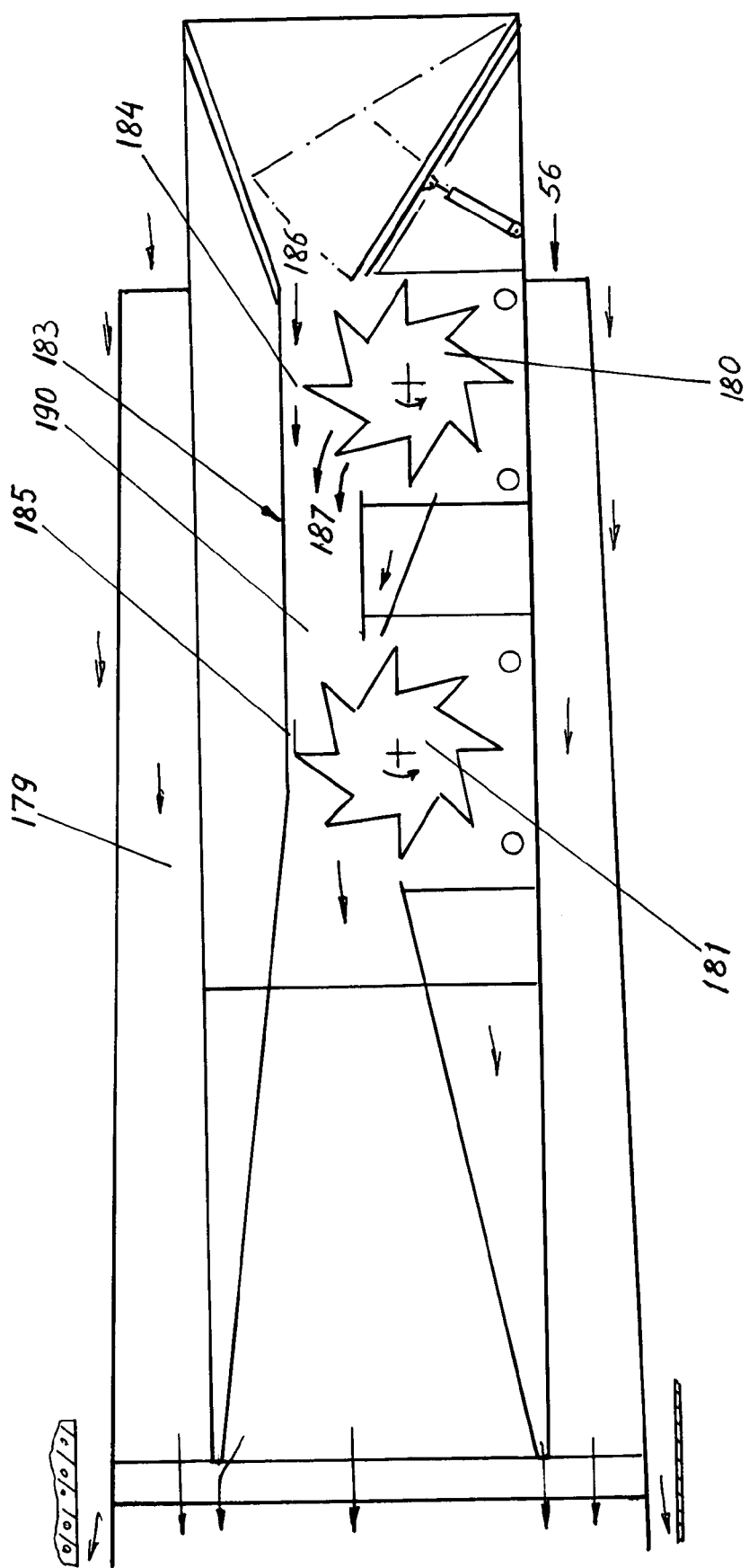
FIG. 5 is a cross-section, taken at lines 3—3 of FIG. 1 of another embodiment of the rotor train, having two rotors, rotating in one direction.

In FIG. 5 we can see rotor train 179, having two rotors positioned in the lower line with the second rotor 181 located mostly behind and partially above the first rotor 180. The guiding plate 183 is having a relatively bigger size and positioned above both rotors 180 and 181, and having a bigger air gap 184 above the first rotor 180 and a smaller air gap 185 above the second rotor 181, allowing a thin stream of wind 186 to flow unobstructed above the first rotor 180, involving in the fast flow the streams of wind 187, discharged from the blades of the first rotor 180 and striking on the blades of the second rotor 181. This rotor train can be located at the levels close to the base 22 of the building 20.

Since the height of the air concourses 52 can be chosen equal (but not necessary) for all the levels of the building 20, the rotor trains with two or one rotor will have more space inside the shroud 114, and these rotors can be made of a relatively bigger size.

Figure 6:
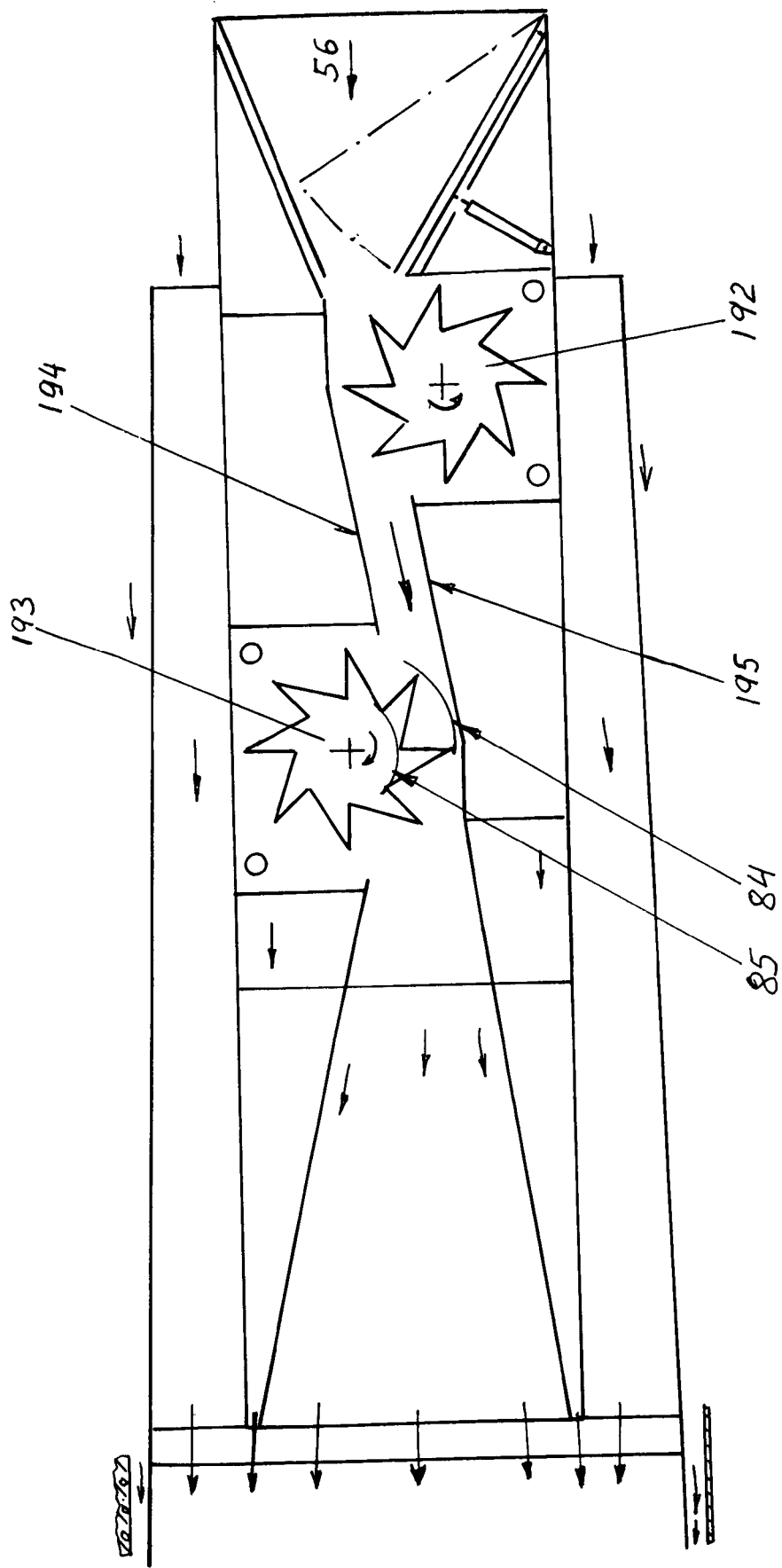
FIG. 6 is a cross-section of the rotor train, having two rotors, rotating in different direction.

FIG. 6 depicts a rotor train, also having two rotors; the first rotor 192 in the lower line and the second rotor 193 in the upper line, partially behind and partially above the first rotor. The guiding plate 194 is located above the first rotor 192, the guiding plate 195 is positioned below the second rotor 192, both guiding plates are partially bent and declined downwardly to the vertical level of the inner circle 85 of the second rotor 193 and below the outer circle 84 of the second rotor, allowing a thin stream of wind to flow unobstructed above the first rotor 192 and below the second rotor 193, involving in the fast movement the wind 56, blowing on the front sides of the blades.

FIG. 7 shows a rotor train, having one rotor 198 positioned in the lower line. Since the shroud of this rotor train is having an ample space both in the vertical and the horizontal direction, the rotor 198 can be made of a bigger size of the inner and the outer circles, and the angles of inclination of the nozzle panels and the plates of the diffuser can be chosen small enough to provide less possible for the incoming wind. This rotor train can be positioned at the base 22 of the building. FIG. 7 also shows that the exit 120 of the wind tunnel 137 is having a bigger height that the entrance 118 and the entrances 157 of the super-diffuser 116 is situated at the bending line 123 of the upper 130 and lower 131 plates.

Figure 8:
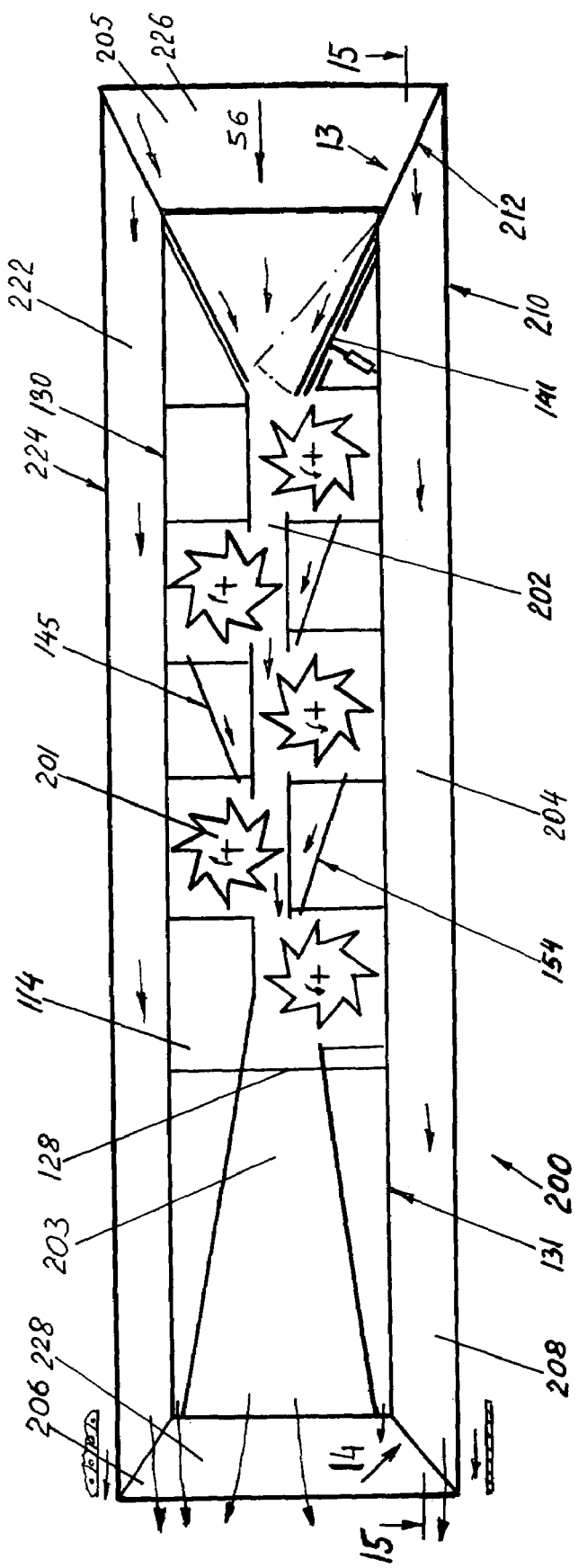
FIG. 8 is a cross-sectional view of another embodiment of the rotor train, having five rotors and a booster.

FIG. 8 illustrates another embodiment of the rotor train. This rotor train, generally defined by the numeral 200 is equipped with 5 rotors 201, and having 3 rotors in the lower line and two rotors in the upper line. These rotors are having relatively smaller inner and outer circles to accommodate more rotors in the wind way 202. The difference between the rotor train 202 and the already described rotor trains 55, 177 and 179 is, that the rotor train 202 instead of the super-diffuser is equipped with a booster 204, which provides an extension of the area of the entrance 205 to the wind tunnel 203, as well as the area of the exit 206, increasing the contraction ratio of the wind tunnel 203, which is in our case the ratio between the height of the entrance 205 to the height of the wind way 202.

The booster 204 includes: a lower booster 208, providing an additional fast flowing air to the entrance 205 of the wind tunnel 203 from the areas below and ahead of the entrance 205 and diminishing the turbulence of the wind in the entrance, at the same time lowering the static air pressure at the exit 206. The lower booster includes a lower booster plate 210, bent correspondingly to the lower plate 131, and is having a front side, a back side and two lateral sides, this lateral sides positioned in the vertical planes passing through the lateral sides of the plates 130 and 131 of the shroud 114. The plate 210 positioned at some distance from the plate 131, this distance is defining the height of the lower booster 208. The front side of the plate 210 positioned ahead and below of the front side of the plate 131.

Figure 25:
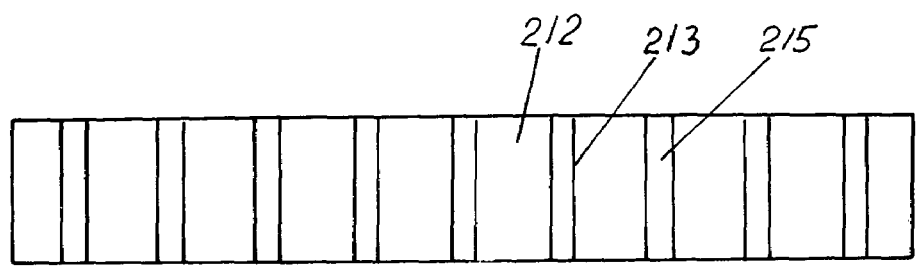
FIG. 25 is a view of the front booster plates at arrow 13 of FIG. 8.
Figure 26:
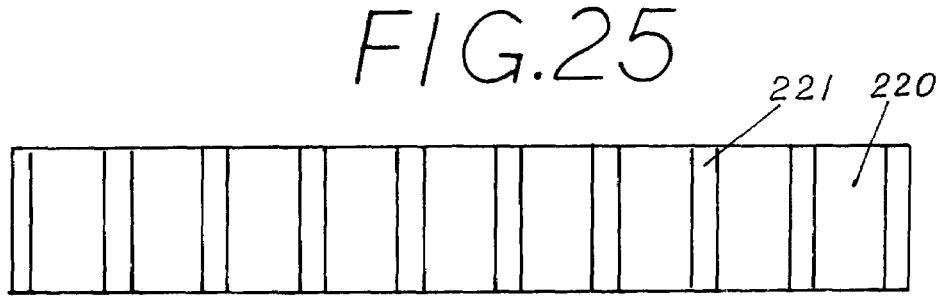
FIG. 26 is a view of the back booster plates at arrow 14 of FIG. 8.
Figure 27:
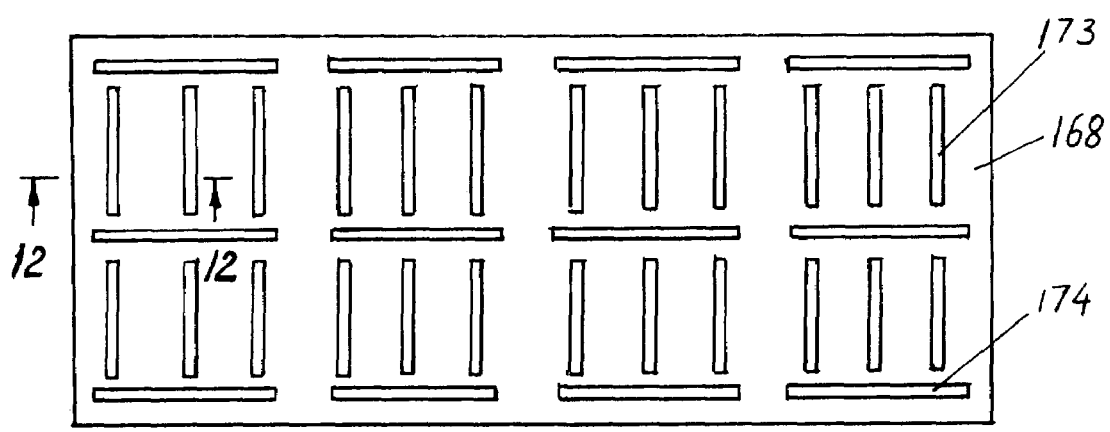
FIG. 27 is a view of the lower nozzle panel, taken at the arrow 10 of FIG. 3.
Figure 28:
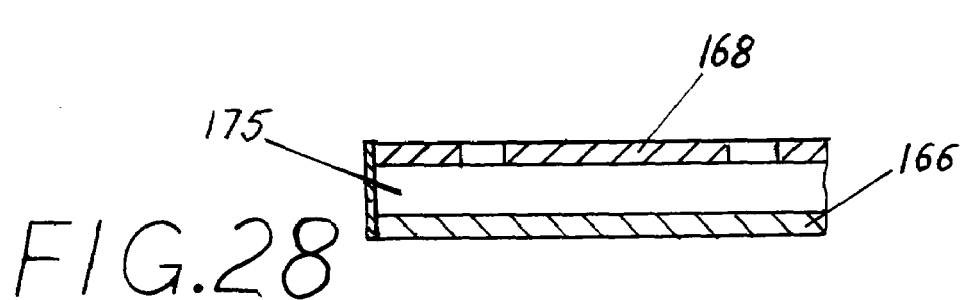
FIG. 28 is a partial cross-sectional view of the lower nozzle panel, taken at lines 12—12 of FIG. 27.

Now we need to take a look at FIGS. 8, 25 and 26, showing views at arrows 13 and 14 of FIG. 8 and at FIG. 24, showing a cross-section at lines 15—15 of FIG. 8.

Two lateral walls 211 of the lower booster 208 are connecting the plate 210 with the plate 131 and the walls 121 of the shroud 114. The walls 211 are positioned in the same vertical planes as the walls 121. A plurality of lower booster front plates 212, having a rectangular shape with a front side, a back side and two lateral sides, are positioned in a continuation of an inclined plane, passing through the lower nozzle panel 141. One of the front plates 212 is fixed to one of the walls 121, the other front plate is fixed to the opposing wall 121, all the other front plates 212 are spaced apart, evenly distributed and fixed along the front sides of the plates 131 and 210, leaving narrow vertical openings between their lateral sides. These openings are defining inlets for the wind, blowing through the lower booster 208.

A plurality of identical narrow and long boards 216, fixed to and between the plates 131 and 210. These boards are having height equal to the height of the lower booster 208, a front side, cut to fit behind the front plates 212, and a back side, cut to fit to a plane, passing through the back sides of the plates 131 and 210. The boards 216 are positioned laterally behind of the lateral sides 213 of the front plates 212 and diverging symmetrically at an angle no bigger than 20 degrees from each other forming a plurality of narrow air diffusers 218 between the inlets 215, plates 210 and 131 and the diverging boards 216. These air diffusers are gradually increasing in the cross-sectional dimension between the diverging boards 216 and have outlets 220 for the wind, flowing in the extended area of the exit 206 behind the wind tunnel 203.

A plurality of back booster plates 221 are fixed between the back sides of the 1 plates 131 and 210 between the outlets 220; these plates are providing additional guiding surfaces for the air, flowing out of the exit 206, allowing the air gradually expand and, mixing with the air, flying from the outlets 220, lowering the static air pressure behind the wind tunnel 203 and creating an additional tunnel suction for the wind way 202.

An upper booster 222 is providing an additional fast flowing air to the wind tunnel 203 from the area below and ahead the shroud 114 and lowering the static air pressure behind the wind tunnel 203. The upper booster 222 include a plate 224, identical to the lower plate 210 of the lower booster 208, this plate positioned at the same distance from the upper plate 130 and in the same vertical planes with the lower booster plate 210, and bent correspondingly to the upper plate 130. The upper booster 222 also have front booster plates 212, back booster plates 221 and diverging boards 216, forming air diffusers 218 of the upper booster 222. The booster 204 is having vertical walls 226, connecting the lateral sides of the plates 210 and 224 at the entrance 205 and two vertical walls 228, connecting the lateral sides of these plates at the exit 206.

All the mentioned parts of the booster 204, as well as all the parts of the shroud, the wind tunnel, the super-diffuser, the guiding plates and the pumping plates should be maid of a rigid, strong and durable material, having the lowest possible coefficient of friction with the wind flow.

Figure 9:
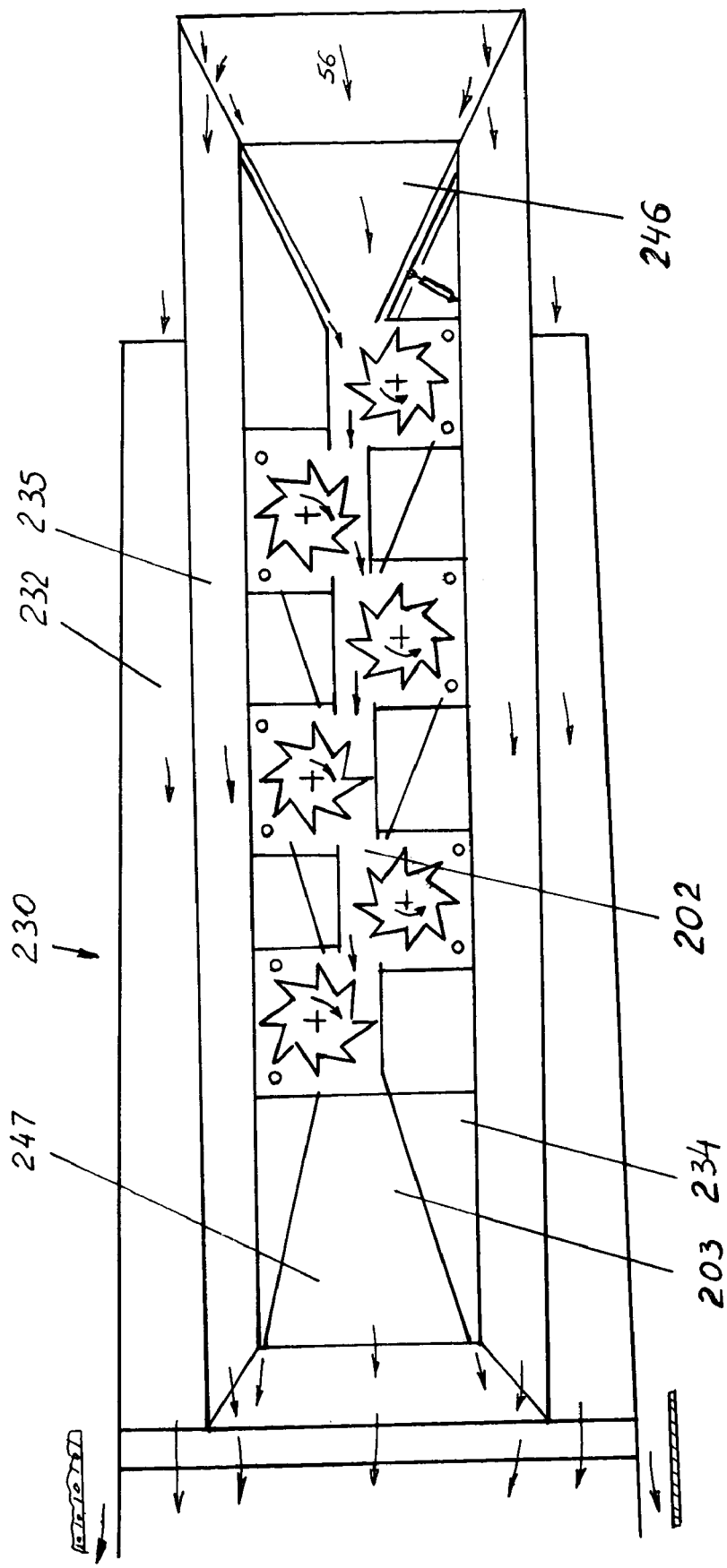
FIG. 9 depicts a cross-section of a rotor train, equipped with the booster, the super-diffuser and six rotors.

In FIG. 9 we can see a rotor train, indicated by the numeral 230, that has 6 rotors, three in the lower line and three in the upper line. The positioning of the rotors is similar to positioning of the rotors in the previous embodiments. The rotor train 230 is equipped with a super-diffuser 232, attached to the booster 235 and partially encasing the booster and the shroud 234. The design of the super-diffuser 232 is similar to the already discussed supper-diffuser 116, attached to the shroud 114.

Figure 10:
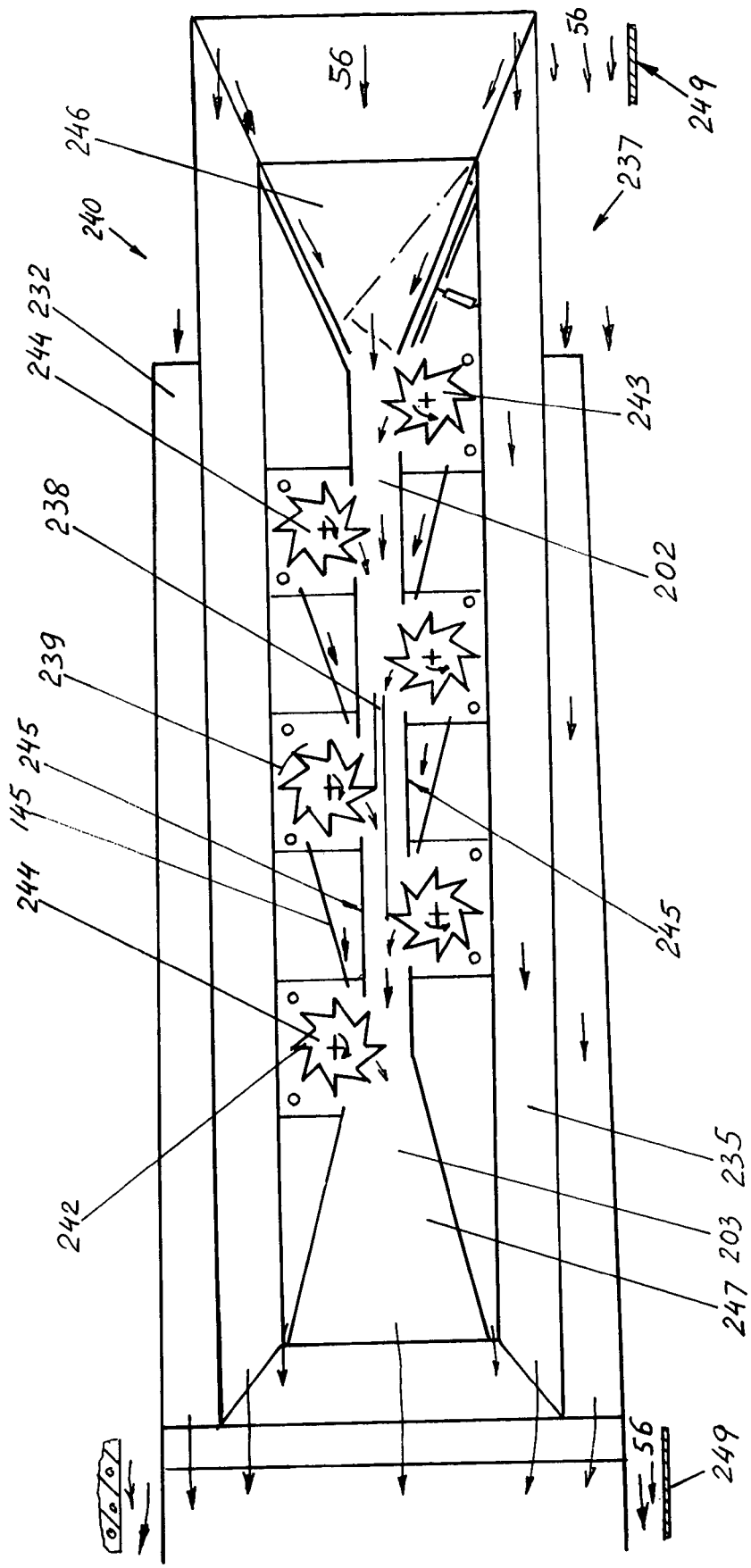
FIG. 10 depicts a cross-section of an embodiment of a rotor train, similar to shown in FIG. 9, but having a bigger air gap in vertical direction between the rotors.

FIG. 10 depicts a rotor train 237 that has 6 rotors, a booster 235 and a super-diffuser 232. This rotor train is having a small air gap 238 between the outer circles 239 of the rotors 240, allowing a thin stream of wind to flow unobstructed between the outer circles 234 of the rotors 232 and between the guiding plates 245, involving by the frictional forces in the fast movement of the streams of wind, discharged from the blades 242 of the rotors 240 and increasing the speed and the force of the wind, striking on the blades. This air gap can be received by diminishing the outer circles 239 of the rotors 240 and by increasing the distance between the lower line 243 and the upper line 344 of the rotors 240.

To continue the description of the rotor trains, we can take a look now at FIGS. 12, 13, 14 and 15.

Figures 12, 13:
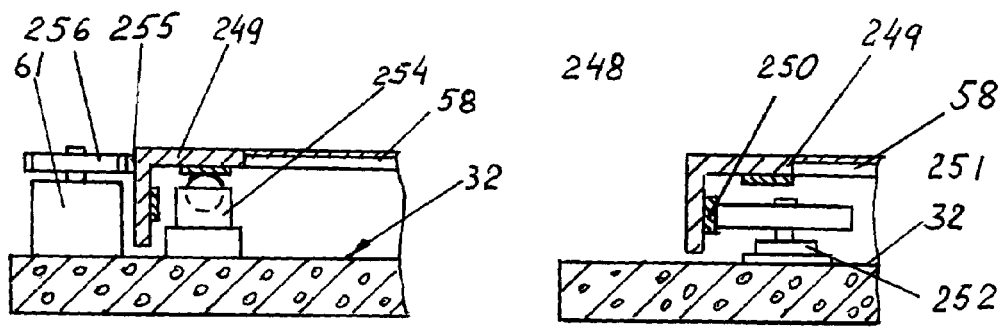
FIG. 12 shows a partial cross-sectional view of the turntable and the stationary horizontal wheel.
FIG. 13 shows a partial cross-sectional view of the turntable and the servomotor.

FIG. 12 shows a partial cross-section of the turntable 58, mounted on the floor 30. The turntable 58 has a cylindrical collar 248, running around the turntable. This collar has a maximum radius allowing rotating the turntable around the axis 23 between the pillars 50. A horizontal platform 249 is mounted on the turntable. The turntable is covered below the shroud by a laminated layer for diminishing friction with the wind flow. A ring rail 250 is fixed to the inner surface of the collar 248, opposing to a plurality of horizontal wheels 251, mounted on brackets 252, fixed to the floor 30. The wheels 251 are providing stability and security against the wind on the lower level of the turntable 58.

FIG. 13 illustrates another partial cross-section of the turntable 58. A horizontal rail ring 253 is fixed from beneath to the turntable 58. A plurality of bearing assemblies 254 is fixed opposite to the horizontal rail ring 253 and provide support for the weight of the turntable 58. A gear ring 255 is fixed to the cylindrical collar 248, opposing to a gear wheel 256, fixed to the servomotor 61, installed on the floor 32.

Figure 14:
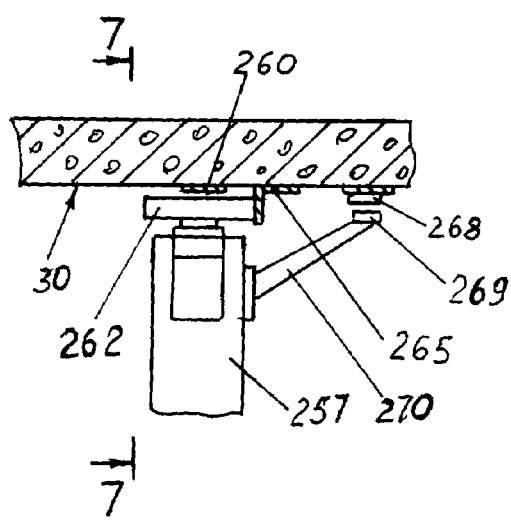
FIG. 14 shows a partial view of a post of the supportive structure with a view of the horizontal wheel, the actuator and the positional sensor.
Figure 15:
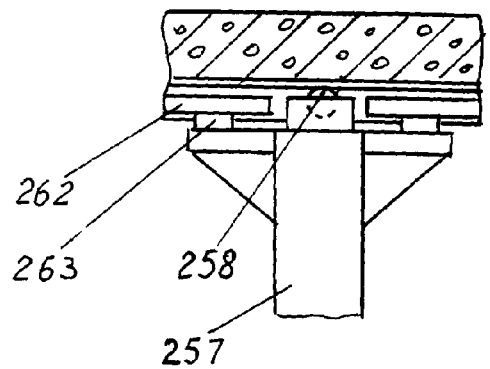
FIG. 15 is a partial cross-sectional view, taken at lines 7—7 of FIG. 14 with a view of the horizontal wheels and the vertical bearing assembly.

FIGS. 14 and 15 illustrate supports for the turntable 58 against the wind, blowing through the air concourse 52. A plurality of vertical posts 257 is fixed to the supportive structure 62, mounted on the turntable 58. A bearing assembly 258 is fixed to the post 257 with a small air gap with a horizontal rail ring 260, fixed to the ceiling 30. Two horizontal wheels 262 are fixed on brackets 263 to the post 257. A horizontal rail ring 265, concentric with the vertical axis 23 is fixed to the ceiling 30, opposite horizontal wheels 262. The support, providing by the rail ring 265 to the wheels 262 provides additional stability and security for the turntable 58.

A large circle of positional sensors 268 spaced apart, circumferentially distributed around the vertical axis 23 and fixed to the ceiling 30. An actuator 269 is fixed on a bracket 270 and opposite to the censors 268 while rotating together with the post 257 and the turntable 58. The purpose of the sensors 268 and of the actuator 269 will be explained later.

Figure 19:
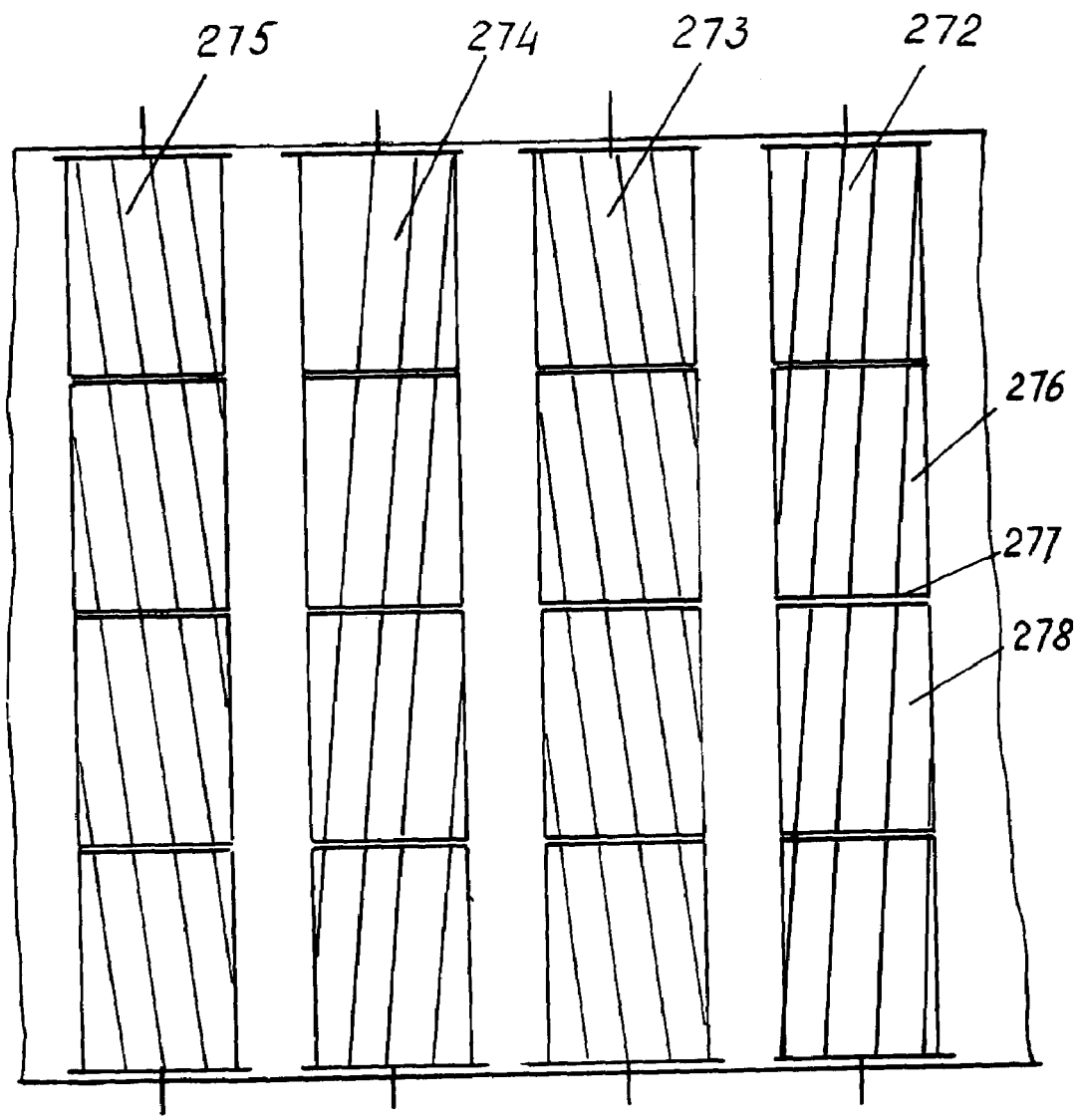
FIG. 19 is a top view of the rotors, having helically pitched blades.

FIG. 19 shows a rotor train, having rotors helically pitched in one direction for the lower line of rotors 272 and 274 and in another direction for the rotors 273 and 275 of the upper line. The rotors can be assembled from separate modules 276, having the diameter of lateral disk 277 equal to the inner circle of the rotor and the blades 278 of all modules aligned along the length of the rotor.

In FIGS. 20 and 21 we can see a rotor 280, assembled of lateral modules 281 and intermediate modules 282. Each of the modules have lateral side disks 283 and blades 284 fixed between these disks. The blades 284 of each module are shifted by an angle from a center point, defined by the horizontal axis of rotation 67 relative to the blades of the connected module.

In FIG. 21 we can see a cross-sectional view of one module, combined with a cross-sectional view of the connected module, shown by broken lines. The front sides of the blades 285 of one module appear between the blades 286 of the other module.

Now we can return to already mentioned computer 43, installed in the stability belt 24 near the base 22 and shown in FIG. 11. This computer is operationally connected with the pistons 143, used as power drives to changeably cover from the wind part of the entrance 118 of the wind tunnel 137 to avoid synchronous rotation of two or more rotors 66 from different levels of the building 20, or to completely cover the entrance 118 in the case of too strong wind or for maintenance, or in a case of a lower demand for electrical power. The computer 43 is constantly monitoring the rotational speed of each of the first rotors by receiving signals from the sensors 110 (FIG. 11) activated by the actuators 112, rotating with the clutch 105. The sensor 110 is sending signals to the computer 43 with every revolution of the central half-shaft 95, and by comparing the time between the signals, the computer 43 can determine the rotational speed of the rotors, and if necessary, change the angle of inclination of the lower nozzle panel 141, lifted by the pistons 143.

Figure 17:
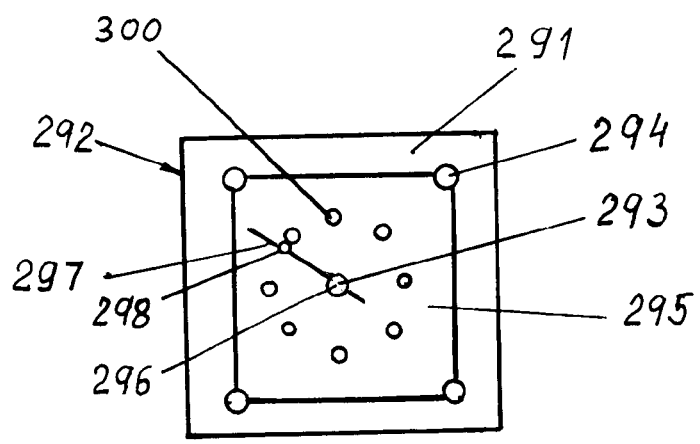
FIG. 17 is a cross-sectional view of wind finder, taken at lines 5—5 of FIG. 1.

The power plant is equipped with a computerized system for positioning the rotor trains of every level of the building 20 towards the prevailing direction of the wind 56. The system includes a wind finder 290, mounted on the roof of the building 46 (see FIGS. 1 and 17). A small roof, protecting from snow, rain, vertically blowing wind and from sun is having a perimeter 292 and a center of symmetry 293. A plurality of vertical supports 294 are fixed to the roof 46 of the building 20 and secure the small roof 291 above the roof 46 inside of the perimeter 292. A horizontal plate 295 is fixed to the vertical supports 294 close to the small roof 291. An axle 296 is mounted between the plate 295 and the roof 46. A weather vane 297 is pivotally mounted to the axle 296. An actuator 298 is attached to the weather vane 297 and rotating together with the weather vane under influence of the wind. A small circle of positional sensors 300 is circumferentially arranged around the axle 296 and fixed to the plate 295 above the actuator 298; each of the sensors 300 indicate a different direction of the wind and sending signals to the computer 43 being activated by the actuator 298.

A plurality of large circles of positional sensors 268 (see FIG. 14) is installed in the air concourses 52 of the building 20, one large circle for each one air concourse. Each large circle 268 comprises a number of sensors equal to the number of sensors in the small circle 300. The sensors of the large circle 268 are spaced apart and circumferentially fixed around the vertical axis of rotation 23 to the ceiling 30 above the turntable 58. Each sensor 268 is connected to the computer 43 and indicates to the computer the current position of the rotor train towards the prevailing wind 56, and possible necessity for the computer 43 to send command to the servomotor 61 to rotate the turntable in a new direction. The actuator 269 is activating the sensors 268, while rotating together with the turntable 58.

Returning to FIG. 16, we can see that the elevators 38 and the stairs 41 are adapted to provide less possible interference with the flow of wind, blowing towards the air concourses. The elevators 48 and the stairs 41 are positioned outwardly relative to the pillars 50 from the side of the building 20, facing less possible amount of the wind during the year, and the cabin 38 is usually located in one of the stability belts 24 or in the base 22, having only the trailing rails exposed to the wind flow across the air concourse 52. Each of the air concourses 52 is covered along the perimeter of the upper horizontal decks 26 with a steel net 303 as a safety measure and for protection of the bird population.

The solar panels 36 (see FIGS. 1 and 16) are mounted on the balconies 34 around the stability belts 24 from the east, the south and the west sides of the building 20. The solar panels 54, mounted on the roof 46 of the building and by known means adapted for positioning toward the sun and for converting the solar radiation into electricity. All mentioned solar panels are operationally coupled with the power storage assemblies 45, installed inside the stability belts 24.

The solar panels 37, positioned on frames 36, and the tilted plates 47 are adapted to deflect the wind, blowing towards the stability belts 24 to the air concourses 52, adjacent to these stability belts and located above these belts. All these panels, frames, and plates are connecting the perimeters of the lower decks 37 with the perimeters of the upper decks 26, contracting the wind, entering into the air concourses, increasing the speed of the wind and the efficiency of the rotors. The solar panels 37 are mounted from the east, the south and the west sides of the building. The tilted plates 47 are made of rigid, strong and durable material, having low coefficient of friction with the air currents and fixed on the balconies 34 from the north side of the building 20.

OPERATION OF THE PREFERRED EMBODIMENTS

Figure 18:
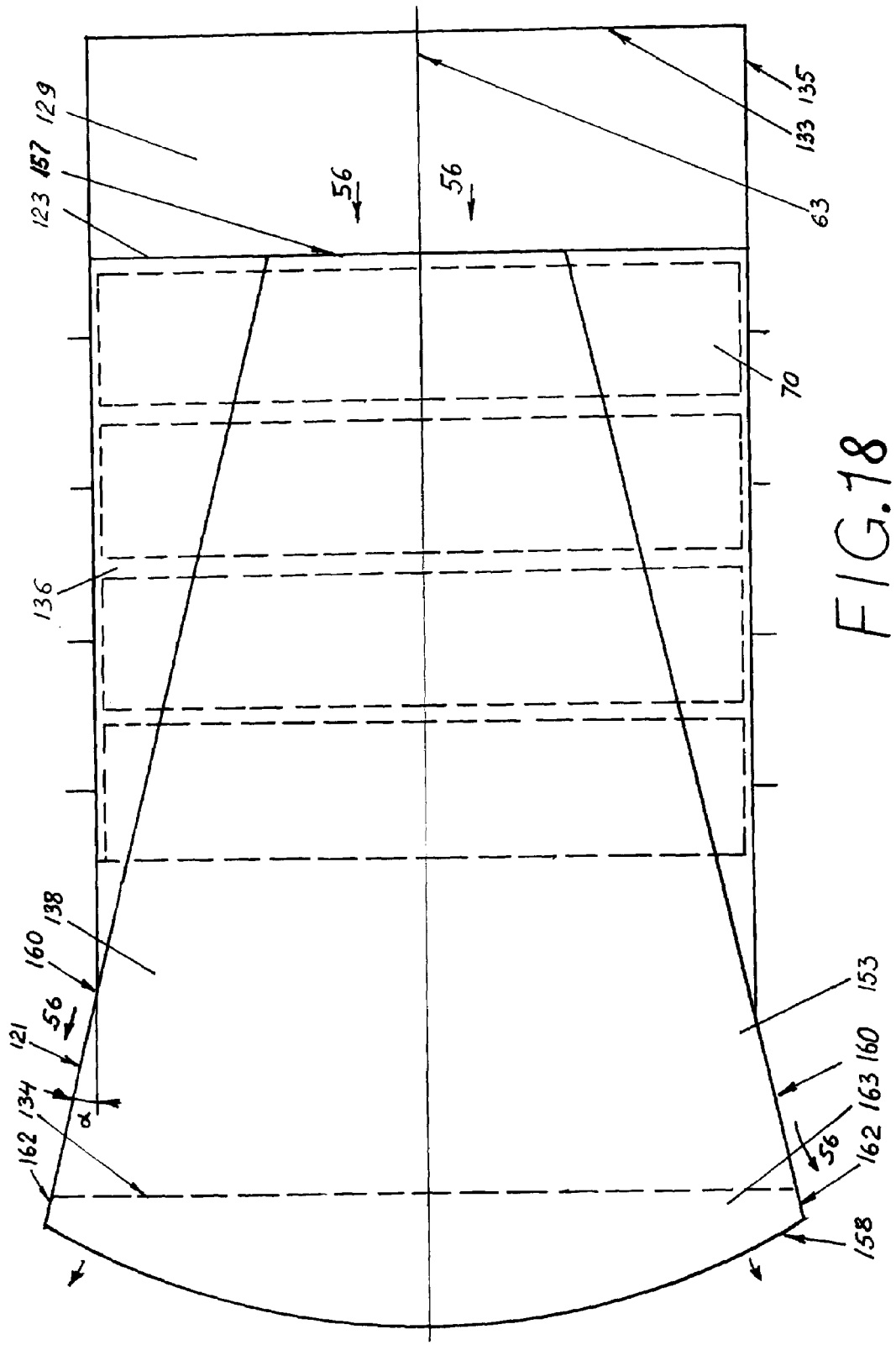
FIG. 18 is a top view of the super-diffuser in connection with the shroud and the rotors.

Basically, the operation of all of the embodiments of the invention is the same. Each of the rotor trains shown, for example, in FIGS. 3 and 18, is having the high rectangular entrance 118 for the wind 56. The steams of the wind are gradually contracted by the converging nozzle panels 141 and 142 to a low rectangular wind way 140, where the wind, pressed in the vertical direction, flow much faster compared with the speed of the ambient wind. At the exit of the diffuser 120 the gradually diverging plates 153 and the diverging parts of the vertical walls 121 allow the air, flowing out of the wind way 140, to gradually expand in the vertical and the horizontal dimensions to the volume, bigger than it had at the entrance 118, creating a zone of low static air pressure in the diffuser 120 and a tunnel suction in the wind way 140, causing increase in the speed of the wind inside the wind way. An additional, enlarged zone of low static air pressure is provided by the super-diffuser 116. This low static air pressure is created by the air, captured by the narrow entrances 157 above and below of the shroud 114 and gradually expanding inside of the air passages while flowing between the plates 130, 131, and diverging plates 153, 156, 160, 162 to the exits 158 above, below and behind of the exit 120 of the wind tunnel 137. This low static air pressure creates a permanent air suction inside of the wind tunnel and an increased wind speed inside of the wind way 140.

Returning once again to FIG. 3, we can see that this cross-section is similar to a cross-section of a venturi type tube, having a long throat in the middle of the air passage. But, if we will take a top view, as in FIG. 18, we can see that the shroud 114 and the wind tunnel 137 are having mostly a rectangular shape and contracting the wind streams only in the vertical direction. It allows to avoid mixing up different streams of the air, pressed from a bigger diameter to a smaller diameter along the surfaces of the frusto-conical tube and to avoid development of eddies and turbulence from every possibly direction, which is common in the venturi. The possible eddies and turbulence at the areas of the entrance 118 and the exit 120 can occur only in the vertical direction and can be reduced by the implemented small angles of inclination of the nozzle panels 141, 142 and the diffuser plates 153. The eddies at the area of entrance 118 can be also reduced by the slots 173 and 174, allowing some of the air streams to pass through these slots and between the flat surfaces of the plates 168 and 170 towards the blades of the first rotor 70.

The speed of the wind flow along the wind way 140, as we already discussed, will be at least 6 times faster than the speed of the ambient wind, and in the embodiments of the invention, equipped with the booster 204, the increase of the wind speed will be even more than 10 times. At least one blade 78 of each rotor 66 is protruding at any time in the wind way 140, and the striking of the wind on the front sides 80 of the blades 78 causes a fast rotation of the rotors as it shown by the arrows in the drawings. Most of the air, trapped between the blades 78 will be discharged back into the wind way by the back sides of the blade 78, streamlined for less friction with the incoming air.

The volume of the air, trapped between the blades 78 of the invention is almost two times less, than in the conventional rotors. FIG. 22 illustrates the blades of the rotor, known in the Prior Art which can be compared with the blades of the rotor of the invention, shown in FIG. 23. The hatched areas between the blades indicate the spaces, which will be filled with the air from the wind for both rotors. These spaces are almost two times bigger for the conventional rotor. It means that it needs twice the time to build up the same pressure on the front side of the blade for the conventional rotor compared with the rotor of the invention. The curved blades of the conventional rotor creating numerous eddies, shown by arrows, preventing the incoming wind from striking on the blades at a right angle and not allowing the air to be discharged from the blades, creating friction and resistance for the rotation of the rotor.

The blades 78 of the invention are having a shape of a triangular prism, which is the most unchangeable geometrical shape, similar to the shape of the ancient pyramids, providing a possibility to work with almost any reachable speed. Since there is only a small volume of air accumulated between the blades 78, the rotation of the rotors will be smooth and quiet and it creates fewer disturbances for the wind, flowing in the wind way 140. Consequently, less air will be pumped in the inner space between the shroud 114 and the wind tunnel 137. The helically pitched blades, shown in FIG. 19, are allowing very quiet and smooth rotation of the rotors 278. These blades are allowing a continuous impact of the wind on one blade 278 while the rotor rotates at a bigger angle, than a rotor with a blade, fixed parallel to the horizontal axis of rotation 67 and a continuous smooth discharge of smaller portions of the air from the blades into the wind way 140. The positioning of the helically pitched blades 278 of the upper and the lower lines 64, 65 in opposite direction allowing the wind, discharged from one rotor to strike on the blades of adjacent rotor at the right angle in a zigzagging way from one rotor to another rotor. Another embodiment of the rotor, shown in FIGS. 18, 19 also provides a smooth and quiet rotation. The shown rotor comprise several connected modules, and these modules are connected in such a way, that the blades of one module are shifted by an angle from a center point, defined by the horizontal axis of rotation of the rotor, relative to the blades of the connected module, so that the blades of another module, connected with the first one, appear in the wind way at a different time and the wind is striking on the blades and discharges from the blades with smaller portions of air.

Since the rotor is hollow inside of the perimeter, made of connected together front 80 and back 82 sides of the blades 78, it can be made very light, especially if it will be made of contemporary non-metallic materials, such as honeycomb sandwich panels, covered with laminated layers or fabricated from aramid fiber or from uni-directional carbon fiber of other light weighted materials, having less possible coefficient of friction with the wind flow. So, the light-weighted rotor, well balanced on radial bearing assemblies from both sides of the rotor, will be very easy rotated in the direction of the wind. The flywheel 92 will help to maintain the constant rotational speed despite the temporary changes in the speed of the wind.

As we can see in FIG. 3, the rotors of the upper line 65 and the rotors of the lower line 64 are allowing thin streams of wind to flow unobstructed above the rotors of the lower line to strike on the rotors of the upper line and to flow below the rotors of the upper line to strike on the rotors of the lower line, between the outer circles of the rotors and the opposing guiding plates, involving in the fast movement by the frictional forces the streams of wind, discharged from the blades of the rotors of both lines, increasing the speed of the wind and the efficiency of the rotors. Returning once again to FIG. 3, and to the work of the rotors, we can see that some of the air from the blades of the rotors can be pumped inside of the shroud 114, between the shroud 114 and the wind tunnel 137. This air will be discharged through the gaps 155 between the plates of the diffuser 120 and the plates of the shroud 130, 131. These gaps are working as nozzles for the air, trapped inside of the shroud, allowing the air to be pressed out with a higher speed, involving in the fast movement the air, flowing from the diffuser 120. Some of the air, trapped inside of the shroud 114, will be discharged from the openings 165, providing cooling effect for the electrical generators 109. The air, discharged from the blades 78 on the upper and the lower surfaces of the pumping plates 145, 154 will be directed to the front surfaces of the adjacent rotors. The super-diffuser 116 allows the wind, flowing from the entrances 157 to the exits 158 to expand gradually, creating zone of low static air pressure behind the exit 120 and increasing the tunnel suction in the wind tunnel 137. Additional tunnel suction will be created by the digressed and contracted wind streams, flowing fast and creating zones of low air pressure between the super-diffuser 116 and the horizontal platform 249 of the turntable 58 and between the super-diffuser 116 and the ceiling 30 of the air concourse 52. The lower nozzle panel 141 can be lifted by the pistons 143 around the hinges 144 after a command from the computer 43 and changeably covers the entrance 118 from the wind, changing the rotational speed of the rotors 66, or stopping the rotors completely in case of low demand for the electrical power or for maintenance.

Now we can describe the operation of the rotor train 55 from another perspective, as it shown in FIG. 11. As we can see, the rotors 66 are well balanced symmetrically on the radial bearing assemblies 68 and symmetrically transfer the rotating torque, intercepted from the wind by the blades 78 and transmitted through the disks 91 and hubs 93 to the central half hafts 96, connected through the electromagnetic clutches 105 and through the gear boxes 107 with the electrical generators 109 from both sides of the rotor. The electromagnetic clutches could disconnect the electrical generators from the rotors 66 by commands from the computer 43, allowing the rotors 66 to rotate at idle with the purpose to change the rotational speed of the rotors in a case of synchronous rotation of the rotors at different levels of the building 20, or in a case of a low demand for the electrical power, or very low speed of the wind. Since the energy of the rotors is divided between two generators 109, each of them can be chosen of a smaller side, which makes them easier to install and maintain. The rotational speed of the rotors can be big enough to allow the direct connection of the rotors with the generators 109 without implementing the gear boxes 107.

The operation of all other rotor trains, comprising three, two and one rotor and shown in FIGS. 4, 5, 6 and 7 is the same as it was described for the rotor train 55 with 4 rotors, shown in FIG. 3. The operation of the rotor trains, equipped with 5 and 6 rotors is also, basically, the same. The rotor train 200, shown in FIG. 8, is equipped with the booster 204 instead of the super-diffuser 116. The booster 204 provides to the rotor train 200 a possibility to increase the speed of the wind even more than it was estimated for the rotor train 55. The combined ratio of the configuration of the rotor train 200, as it shown in FIG. 8 will be 10:1, corresponding to the height of the entrance of the wind tunnel, combined with the height of the upper booster 222 and the lower booster 208, which will be approximately ten times bigger than the height of the wind way 202.

The booster 204 provides three important features to the rotor train 200:
1) Increased contraction ratio for the flow of the wind in the wind tunnel;
2) A diminished possibility of eddies and turbulence at the entrance 205 and at the exit 206 of the wind tunnel 203;
3) A lowered static air pressure at the exit 206 of the wind tunnel 203.

All three mentioned features will significantly increase the speed of the wind inside of the wind way 202 and the power of the rotors 201. FIGS. 9 and 10 are showing the rotor trains 230 and 237, having the booster 235 and the super-diffuser 232, both creating a large combined zone of low static air pressure at the exit 247 of the wind tunnel 203, providing even more tunnel suction, than in the previous rotor trains and greatly increasing even the smallest wind at the entrance 246. The increased contraction of the wind at the entrance of the wind tunnel 203 and the increased suction of the air at the exit 247 providing a possibility to install 6 powerful rotors in one rotor train 237 and to position this rotor train at any chosen level above the ground and at any chosen site, close to the consumers of the electrical energy. Even the smallest wind can be increased in more than 10 times, so there is no need to seek a windiest site to build the power plant, to build a high tower and to lift a heavy load on this tower. To better accommodate very high speed, the outer circles 239 of the rotors 240 can be made of a smaller diameter, allowing to collect less air between the blades, providing that the impact of such a wind on the blades of the rotor will be big enough even for a smaller height of the blade. The smaller diameter of the outer circle 239 of the rotors 240 is allowing a wider stream of the wind to flow unobstructed above and below the blades of the rotors, as we can see in FIG. 10, involving by the frictional forces in this fast movement the air, discharged from the blades of the rotors and increasing the rotational speed of the rotors and having a possibility to put more rotors of a smaller size in the same wind tunnel.

The rotor trains are mounted along the height of the building 20 in such away, that rotor trains with a bigger number of rotors are located at the upper levels of the building, and rotor trains with a smaller number of rotors are located closer to the base, at the lower levels of the building.

The operation of the power plant is completely computerized and controlled by the computer 43, installed in one of the stability belts 24. The computer 43 comparing the time between the signals from the speed control sensors 110 for every rotor train of the power plant, and when the time is becoming the same for several rotor trains, the computer sends signals to pistons 143 to change the position of the lower nozzle panel.

The computer 43 can be connected with the central system for production of the electrical energy and works under commands from this central system. The computer 43 is constantly monitoring the position of all the rotor trains relative to the direction of the prevailing wind 56 by analyzing the signals of the small circle of positional sensors 300 of the wind finder 290 and the signals from the sensors of the large circles 268 in each of the air concourses 52, and sends commands to the servomotors 61 of the turntables 58 to rotate the turntables in a new direction, comparing the signals from the corresponding sensors in each of the large circles 268 with the signals from the small circle 300.

The stability and the rigidity of the turntables 58 inside of the air concourses 52 is greatly increased by interaction of the horizontal wheels 262 and the bearing assemblies 258, mounted on the posts 257 with the opposing rail rings 260 and 265, fixed to the ceilings 30 of the air concourses 52.

The solar panels 37 and the tilted plates 47 are deflecting the wind from the stability belts 24 towards the located above air concourses, gradually contracting the wind flowing towards the air concourses, and gradually expanding the wind flowing out of the air concourses, increasing the wind speed inside of the air concourses and the efficiency of the rotors. The solar panels 37, mounted on the balconies 34 and on the roof 46, provide additional electrical power, which can be used for initial positioning of the rotor trains toward the wind 56.

The disclosed features of this invention are allowing to intercept most of the energy of the wind, blowing towards the whole area of the front side of the building, including the areas of the stability belts and the air concourses, and to concentrate this energy on the small areas of cross-sections of the wind tunnels, at the same time increasing the suction in these wind tunnels from the back side of the building.

A variety of changes can be made without departure from the essence and the scope of the invention. Various elements of the invention and the claims may be achieved in a variety of ways, but it will be understood, that the broadest scope of this invention includes such modifications as diverse shapes, sizes, materials and combination of elements. Such scope is limited only by the claims as read in connection with the above specification. Many other advantages of the invention will be apparent from the description and the claims.

We claim:

1. A wind and solar power plant with variable high speed rotor trains, comprising:
  a) a building, said building comprising a base and an imaginary vertical axis of symmetry, said vertical axis having a point near said base, defining a lower level of the building, and a point, defining a roof and a height of the building; a plurality of stability belts, positioned horizontally one above another along said height of the building, spaced apart and distributed between said roof and said base at different levels of the building; each of said stability belts comprising:
    an upper horizontal deck, having a shape of a polygon with equal vertical sides, equal angles between said sides, said vertical sides define a perimeter of said upper deck; a lower horizontal deck, also having shape of a polygon with the same number of equal angles between vertical sides; said vertical sides of a bigger size than of said upper deck;
    vertical walls, connecting said upper deck with said lower deck and forming a balcony along said perimeter of the lower deck and an inner space behind said vertical walls; said inner space further characterized as a place for electrical and mechanical equipment, for storage and maintenance; said inner space further characterized as having additional vertical walls, providing structural rigidity to said stability belts; a plurality of vertical pillars, secured between said stability belts near said angles of said polygons, providing vertical and horizontal integrity to the building; the exact number of said pillars and their cross sectional dimension chosen minimal for developing a less possible interference with the wind; a plurality of air concourses, formed between said stability belts and between said pillars; said air concourses opened for the wind flow from every direction; each of said air concourses having a floor, provided by the horizontal deck of the stability belt, located below and a ceiling, provided by the stability belt, located above thereof; said ceiling covered with a laminated layer for diminishing friction with the wind flow;
  b) a plurality of rotor trains, mounted in the building, one rotor train in each of said air concourses; each of said rotor trains having an imaginary vertical plane of symmetry, passing through said imaginary vertical axis of the building, said imaginary vertical plane defining one side of all parts of said rotor train, facing the prevailing direction of the wind, as a front side; the opposite side, as a back side; and the sides, positioned from both sides of said plane of symmetry, as lateral sides; each of said rotor trains comprising:

a turntable, rotated on said floor of said air concourse; said turntable having a vertical axis of rotation concentric with said vertical axis of the building; said turntable having a servomotor for rotating the rotor train towards the prevailing direction of the wind; said turntable covered with a laminated layer for diminishing friction with the wind flow;

a supportive structure, mounted on said turntable;

means for intercepting the wind and for transforming the power of the wind into rotational torque; said means comprising a plurality of rotors, positioned in an upper and a lower lines; each rotor having a horizontal axis of rotation perpendicular to said vertical plane of symmetry and rotated on bearing assemblies, mounted on said supportive structure from both sides of the rotors; each of said rotors having side disks on both sides of the rotor; blades, attached to said side disks and half shafts, connected with said side disks and supported by said bearing assemblies; said bearing assemblies mounted along the upper and lower lines on said turntable; said rotors having equal distance between said disks along said horizontal axes of rotation, defining the length of the rotors; each of said blades of the rotors further characterized as having a front side with an outer end, defining an outer radius and an outer circle of the rotor and an inner end, defining an inner radius and an inner circle of the rotor; the number of blades of said rotors chosen to be enough to leave at least one blade outside of any tangential plane to said inner circle; said lines of rotors further characterized as having a first rotor positioned in said lower line, facing the prevailing wind; said first rotor positioned farthermost from said vertical axis of rotation of said turntable; said lower line of rotors further characterized as having said rotors positioned one after another at equal distance from each other; all the rotors of said lower line having said front side of the blades facing the wind above said horizontal axes of rotation thereof; said upper line of rotors further characterized as having the first rotor positioned partially behind and partially above said first rotor of said lower line; all other rotors of both lines positioned respectively behind said first rotors;

means for accelerating and guiding the wind flow; said means comprising: a shroud, shaped as a hollow conduit having a rectangular cross-section perpendicular to said vertical plane of symmetry; said shroud having an upper side, a lower side, an open front vertical side, defining an entrance of the shroud, an open back side, defining an exit of the shroud and two lateral sides, defining the vertical walls of the shroud; said walls spaced apart and positioned parallel to said vertical plane of symmetry between said bearing assemblies and said side disks of the rotors, said vertical walls having openings, allowing said central half shafts of said rotors to protrude laterally towards said bearing assemblies, said vertical walls bent behind the last rotors from said back side and diverged laterally outwardly symmetrically to each other at an angle no bigger than 15 degrees from said vertical plane of symmetry;

an upper plate and a lower plate, defined by said upper and said lower sides of the shroud; said plates connecting said vertical walls, encasing said lines of rotors; said upper and said lower plates having a front side, a back side and two lateral sides, partially diverged laterally and outwardly to said back side to connect said vertical walls; said plates positioned at some distance from said turntable and said ceiling providing an open space for an unobstructed wind flow; said upper and said lower plates having a horizontal distance between said front sides and said back sides of the plates defining a length of the shroud, a vertical distance between said front sides as a height of said entrance and a distance between said back sides as a height of the exit of the shroud; each of said upper and said lower plates of the shroud further characterized as having a part of said length of the plate positioned in horizontal plane, and the remaining parts of said plate bent at horizontal line and diverged backwardly at an angle from zero to 15 degrees from said horizontal plane, pointing upwardly for said upper plate and pointing downwardly for said lower plate;

a wind tunnel, mounted inside of said shroud between said vertical walls and said upper and said lower plates; said wind tunnel having an entrance for the wind located at said entrance of the shroud, a contracted in vertical direction middle part, defined as a wind way, and an exit for the wind, positioned at said exit of the shroud; said entrance of said wind tunnel further defined as a nozzle, gradually contracting vertically the wind flow, separated from the ambient wind by said vertical walls of the shroud; said nozzle having a lower nozzle panel and an upper nozzle panel, both panels having front sides, back sides and lateral sides, said lower nozzle panel rotated around a horizontal axis positioned near the front side of said lower plate, and said back side positioned above the horizontal axis of rotation of said first rotor, covering from the wind a part of said first rotor, located below of said back side;

said lower nozzle panel further characterized as positioned at an angle no bigger than 40 degrees and preferably about 30 degrees to the horizontal level; said upper nozzle panel mounted between said vertical walls at an angle to said upper plate no bigger than 25 degrees declining to the horizontal level slightly above said outer circle of the first rotor of the lower line, providing an air gap above said outer circle; said back side of the upper nozzle panel fixed slightly before said outer circle and said front side fixed to said front side of said upper plate;

said wind way of said wind tunnel further characterized as comprising an upper line of guiding plates, fixed between said vertical walls of the shroud at a horizontal level below said horizontal axes of rotation of the rotors of the upper line and above said outer circles of the rotors of the lower lines; a lower line of guiding plates, fixed at a horizontal level below said outer circles of the rotors of the lower line above said horizontal axes of rotation thereof, each one of said rotors of both lines having an opposing guiding plate and an air gap with thereof; each of said guiding plates having a front side, a back side and two lateral sides; the first guiding plate of said upper line connecting said front side thereof with said back side of said upper nozzle panel; said rotors rotating between said front sides and said back sides of the guiding plates, having at any time at least one blade of each rotor protruding into the wind way downwardly for said upper line of rotors and upwardly for said lower line of rotors, causing rotation of said rotors of the upper line in a clock-wise direction, and rotation in a counter-clockwise direction of the rotors of the lower line; said wind way further characterized as having a cross-sectional shape of a low rectangle with the width equal to the distance between said vertical walls and the height equal to the vertical distance between said guiding plates; said wind way further characterized as providing a possibility for narrow streams of wind to blow unobstructed through said air gaps between said guiding plates and said outer circles of the rotors;

said exit of the wind tunnel, defined as a diffuser, said diffuser comprising two plates, gradually diverging from each other and from said wind way at angles no bigger than 20 degrees from the horizontal level, said plates of the diffuser connecting said vertical walls of the shroud slightly below said back side of the upper plate and slightly above said back side of the lower plate of the shroud, leaving narrow air gaps between said plates of the diffuser and said plates, providing exits for the air, pumped between said plates of the shroud and said wind tunnel; said plates of the diffuser having a front side, a back side and two lateral sides; said lateral sides adapted to connect said vertical walls, partially diverged at said exit of the shroud; one of said plates connected with said back side of the last of the guiding plates of the wind way, the other having said front side thereof close to the horizontal level of said horizontal axis of rotation of the last rotor and close to said outer circle thereof; said diffuser providing a gradually expanding vertically and horizontally area, bigger in size compared with said entrance of the wind tunnel, said exit of the wind tunnel defined as an area of lower static air pressure, causing a tunnel suction for the wind flow through said wind way;

lower pumping plates, positioned between said outer circles of said lower line of rotors beneath said guiding plates; each of said pumping plates having a front side, a back side and two lateral sides; said pumping plates having said lateral sides fixed to said vertical walls of the shroud, said front sides positioned below said horizontal axes of rotation of the rotors and said back sides fixed close to said back sides of the lower guiding plates;

upper pumping plates, positioned between said outer circles of said upper line of rotors above said upper guiding plates, each of said guiding plates having a front side, a back side and two lateral sides; said pumping plates having said lateral sides fixed to said vertical walls of the shroud, said front sides fixed above said horizontal axes of rotation of the rotors and said back sides fixed close to said back sides of the upper guiding plates;

a super-diffuser, providing an extended zone of low static air pressure above, behind and below said exit of the wind tunnel and increasing the tunnel suction from said exit of said wind tunnel, said super-diffuser comprising:

an upper air duct, having an entrance for the wind, an exit for the wind and an air passage between said entrance and said exit defined by an upper diverging plate and two vertical diverging lateral plates, fixed to said upper plate of the shroud, and positioned in the vertical planes passing through said diverging parts of the vertical walls of the shroud; said air duct gradually expanding vertically and horizontally from said entrance to said exit; said upper diverging plate positioned symmetrically along said vertical plane of symmetry and at some distance from said upper plate of the shroud, gradually diverging thereof at an angle no bigger than 12 degrees and having a part of said diverging plate overlapping said upper plate of the shroud, leaving some open space between said super-diffuser and said ceiling of the air concourse for a flow of digressed and contracted wind stream;

a lower air duct, identical to said upper air duct, positioned below said lower plate of the shroud, having a lower diverging plate fixed to said lower plate by two vertical diverging plates and equally overlapping said lower plate; said lower diverged plate further characterized as providing some space for a flow of digressed and contracted wind stream between said super-diffuser and said turntable;

two vertical diverging walls, extending said vertical delivering walls of the shroud, connecting the lateral sides of said upper and said lower diverging plates and closing a perimeter of said extended zone of said exit of the wind tunnel;

said shroud, said wind tunnel, said pumping plates and said super-diffuser further characterized as made of a durable, rigid and strong material, having less possible coefficient of friction with the air flow;

means for converting said rotating torque, intercepted by said rotors, into electrical energy, said means comprising electrical generators, having a mechanical connection with said rotors, said electrical generators mounted on said supportive structure from both sides of said rotors;

c) means for deflecting the wind, blowing towards said stability belts in the direction of said air concourse, located above thereof, thereby gradually contracting the wind, blowing through said air concourses, and for gradually expanding the wind flow, blowing out of said air concourses, thereby accelerating the wind, flowing through said air concourses said means comprising:

a plurality of solar panels, adapted to connect said perimeters of said lower decks and said perimeters of said upper decks of said stability belts, said solar panels fixed on said balconies from the south, the east and west side of the building; a plurality of tilted plates, made of a rigid and strong material, having low coefficient of friction with the wind flow, said plates connecting said perimeters of said lower and said upper decks, fixed on said balconies from the north side of the building;

d) means for intercepting the solar energy comprising: said solar panels, fixed on said balconies and solar panels, mounted on said roof of the building; a power storage assemblies, operationally coupled with said solar panels for storing electricity from said solar panels; said power storage assemblies positioned inside of said stability belts;

e) means for controlling the work of the power plant, said means comprising:

a computer, installed inside of one of said stability belts;

a plurality of power drives, connected with said lower nozzle panel, one power drive for each one of said rotor trains, for moving said lower nozzle panel relative to said entrance of the wind tunnel, changeably covering from the wind a part of said entrance, avoiding synchronous rotational speed of two or more rotors from different levels of the building, and completely covering said entrance from extreme high wind, for maintenance and in case of a low demand for electrical power;

an actuator, connected with said central shaft of said rotor and rotating together with said shaft;

a speed control sensor, fixed to said supportive structure and actuated by said actuator with every revolution thereof; said speed control sensor and said power drive further characterized as operationally connected with said computer.

2. The wind and solar power plant with variable high speed rotor trains of claim 1 further characterized as having a computerized system for positioning said rotor trains towards the prevailing direction of the wind, said system comprising:

a wind finder, mounted on said roof of the building, said wind finder comprising: a small roof, protective from snow, rain, sun, and vertically blowing wind; said small roof having a perimeter and a center of symmetry;

a plurality of vertical supports, fixed to said roof of the building along said perimeter of said small roof;

an axle, mounted between said roof of the building and said small roof in said center of symmetry;

a weather vane, pivotally mounted on said axle;

an actuator, attached to said weather vane and rotating together with said weather vane under influence of the wind; a small circle of positional sensors, circumferentially placed, evenly distributed and fixed around said axle above said weather vane to said small roof beneath thereof, each of said sensors connected with said computer and indicating to said computer a different direction of the wind; said sensors sending signals to said computer being activated by said actuator;

a plurality of large circles of positional sensors, installed in said air concourses, one large circle of said positional sensors in one air concourse, each large circle comprising a number of sensors, spaced apart, circumferentially distributed and fixed around said vertical axis of rotation of said turntable to said building; the number of said sensors in said large circle equal to the number of said sensors in said small circle and each one of said sensors of said large circle has a corresponding sensor in said small circle; each of said positional sensors, installed in said air concourse connected with said computer and indicating for said computer the current positioning of said rotor train towards the prevailing direction of the wind and possible necessity for said computer to send command to said servomotor of said turntable to rotate the turntable in a new direction; an actuator, attached to said supportive structure of said rotor train, activating said positional sensors of said large circle while rotating with said turntable.

3. The wind and solar power plant with variable high speed rotor trains of claim 1 wherein said entrances of said super-diffusers positioned on said bending lines of said upper and said lower plates of the shroud.

4. The wind and solar power plant with variable high speed rotor trains of claim 1 wherein said bending lines of said upper and said lower plates of the shroud positioned close to said front sides of said plates, and said entrances to the super-diffuser positioned on said bending lines.

5. The wind and solar power plant with variable high speed rotor trains of claim 1 wherein at least one of said rotor trains, located near said base, comprise two rotors, one rotor in said lower line and one rotor in said upper line, said rotor in the upper line further defined as a second rotor, said second rotor positioned partially behind and partially above said rotor of the lower line, said guiding plates partially bent and declined downwardly correspondently to the vertical levels of said inner circle of said second rotor and below said outer circle of the second rotor below the horizontal axis of rotation of the second rotor.

6. The wind and solar power plant with variable high speed rotor trains of claim 1 wherein at least one of said rotor trains comprise two rotors, said rotors positioned in said lower line of rotors with the second rotor located mostly behind and partially above said first rotor and said guiding plate of said upper line having relatively bigger size and positioned above both rotors, forming a bigger gap above said first and a smaller gap above said second rotor, said bigger gap allowing a thin stream of wind to flow unobstructed above said first rotor, and strike onto the blades of the second rotor; said rotor train located at the levels close to said base of the building.

7. The wind and solar power plant with variable high speed rotor trains of claim 1 wherein said rotor trains with a bigger number of rotors located at the upper levels of the building, and the rotor trains with a smaller number of rotors located at the lower levels of the building.

8. The wind and solar power plant with variable high speed rotor trains of claim 1 wherein said rotor further characterized as adapted for high rotational speed, said blades of the rotor having a shape of triangular prism with one side of said prism defining said front side of the blade, and another side defining a back side of the blade, said front side of the blade positioned on a part of a radius from said horizontal axis of rotation of the rotor; said back side of the blades connecting said outer end of the front side of one blade with the inner end of the front side of the adjacent blade, creating a streamlined surface between the adjacent blades and a closed perimeter of the rotor.

9. The wind and solar power plant with variable high speed rotor trains of claim 1 wherein said rotor comprise two lateral modules and a plurality of intermediate modules, dividing said rotor along said length and along said horizontal axis of rotation thereof, the first of said lateral modules having two lateral disks and said half haft, connected to said disks to transfer a half of the rotating torque from said blades of said rotor to said electrical generator, said half shaft supported by said bearing assembly from one side of said rotor; the second lateral module, identical to said first, positioned symmetrically to said first from another side of said rotor and transfer the other half of the rotating torque to another electrical generator; all of said modules connected by said lateral sides; each of said modules having a plurality of blades, fixed between said lateral sides; said modules having inner disks, fixed inside of said inner circles of said modules to provide rigidity to said rotor.

10. The wind and solar power plant with variable high speed rotor trains of claim 9 wherein said modules of said rotors connected in such a way, that said blades of one module are shifted by an angle from a center point, defined by the horizontal axis of rotation of said rotor, relative to the blades of the connected module.

11. The wind and solar power plant with variable high speed rotor trains of claim 1 wherein said blades of the rotors made of light weight materials comprising laminated honeycomb sandwich panels.

12. The wind and solar power plant with variable high speed rotor trains of claim 1 wherein said blades of the rotors helically pitched in one direction for said lower line of rotors and in an opposite direction for said upper line of rotors.

13. The wind and solar power plant with variable high speed rotor trains of claim 1 wherein said turntable comprise means for providing additional stability and security against the strongest winds, blowing through said air concourses, said means comprising rotating members, fixed to said supportive structure of said turntable and opposing to said rotating members circular guides, fixed to said ceiling of said air concourse, concentric with said vertical axis of rotation of said turntable.

14. The wind and solar power plant with variable high speed rotor trains of claim 1 wherein said lower nozzle panel and said upper nozzle panel of said wind tunnel comprising an outer plate and an inner plate, each of said plates having a front side, a back side, two lateral sides and two flat surfaces, said outer plates having a plurality of slots, cut through said flat surfaces, said outer plate and said inner plate fixed parallel to each other and at some distance between said flat surfaces along said lateral sides and said front sides, leaving opened narrow rectangular exits between said back sides of said plates; said slots, said distances between the flat surfaces and said rectangular exits provide a possibility for same air streams to pass through said exits towards the blades of said first rotor, breaking down eddies of the air at said entrance of the wind tunnel.

15. The wind and solar power plant with variable high speed rotor trains of claim 1 wherein said mechanical connection of said electrical generators with said rotors comprise remote operated clutches, connected with said computer, said clutches allowing to disconnect said rotors from said generators under commands from said computer, providing an idle rotation of said rotors.

16. The wind and solar power plant with variable high speed rotor trains of claim 1 wherein said building equipped with elevators and stairs, designed to provide less possible interference with the wind, flowing towards said air concourses, said elevators further characterized as positioned outwardly of said pillars from the side of the building, receiving less wind during the year, said elevators having a cabin, located during the operation of the rotor trains inside of one of said stability belts or in said base, having only trailing rails exposed to the wind, flowing towards said air concourses.

17. The wind and solar power plant with variable high speed rotor trains of claim 1 wherein said means for accelerating and guiding the wind, flowing through said wind tunnel comprise a booster, replacing said super-diffuser and mounted on said shroud instead of said super-diffuser; said booster providing an upper and a lower extensions of areas of said entrance and said exit of said wind tunnel, said extensions connected along said upper and said lower plates of the shroud above and below of said shroud by a plurality of gradually expanding narrow air diffusers, having narrow inlets for the wind in said extensions to said entrance and wider outlets for the wind in said extensions to said exit of the wind tunnel; said air diffusers lowering the static air pressure in said area of the exit, said inlets providing means for breaking down eddies in said entrance, said extensions providing surfaces for guiding the wind toward said entrance and out of said exit of the wind tunnel; said booster further characterized as made of a rigid, strong and durable material, having the lowest possible coefficient of friction with the wind flow.

18. The wind and solar power plant with variable high speed rotor trains of claim 17 wherein said booster comprising:
a lower booster plate, said plate having a front side, a back side and two lateral sides, said lateral sides positioned in vertical planes, passing through said lateral sides of the lower plate of the shroud;
said lower booster plate positioned at some distance below said lower plate of the shroud, said distance defining the height of the lower booster, said lower booster plate bent correspondingly to said lower plate of the shroud, said front side of the lower booster plate positioned ahead and below of said front side of the lower plate of the shroud, said back side of the lower booster plate positioned behind and below of said back side of the lower plate of the shroud;
two vertical lateral walls of the lower booster, connecting said lower booster plate with said lower plate of the shroud and said vertical walls of the shroud, said vertical walls positioned in the same vertical planes with said vertical walls of the shroud;
a plurality of lower booster front plates, each of said plates having a front side, a back side and two lateral sides, said front plates positioned in an extension of an inclined plane, passing through said lower nozzle panel; said front plates spaced apart, and fixed along said front sides of the lower plates of the shroud and the booster, forming said inlets for the wind;
a plurality of boards, fixed to and between said plates of the shroud and the booster, said boards having height equal to said height of the lower booster, a front side, cut to fit behind said front plates of the booster, and a back side, cut to fit to a plane, passing through said back sides of the plates of the booster and the shroud;
said boards positioned behind said lateral sides of the front plates of the booster and diverging from each other, forming an angle no bigger than 20 degrees;
said narrow diffusers gradually increasing in the cross-sectional dimensions between said diverging boards and having said outlets behind said back sides of said boards;
a plurality of back lower booster plates, fixed between said back sides of the plates of the shroud and the lower booster and said narrow diffusers, said plates providing guiding surfaces for the air, flowing out from said exit of the wind tunnel, said air gradually expanding and mixing with the air, flowing from said narrow diffusers, lowering the static air pressure and creating additional tunnel suction for said wind way;
an upper booster, said upper booster having an upper booster plate and a plurality of narrow diffusers identical and symmetrical to said lower booster narrow diffusers, located above said upper plate of the shroud;
two vertical walls, connecting the lateral sides of said plates of said upper and said lower boosters ahead of said entrance of said wind tunnel;
two vertical walls, connecting the lateral sides of said plates of said upper and said lower boosters behind said exit of said wind tunnel.

19. The wind and solar power plant with variable high speed rotor trains of claim 17 wherein said means for accelerating and guiding the wind flow through said rotor train comprise said super-diffuser, mounted above, below, and behind said booster.

20. The wind and solar power plant with variable high speed rotor trains of claim 17 wherein said rotors of said upper and said lower lines positioned in said wind way with a small air gap in the vertical direction between said outer circles of said rotors, said air gap allowing a thin stream of wind to flow unobstructed between said outer circles.

* * * * *